(12) United States Patent
Shabtay et al.

(10) Patent No.: US 12,105,259 B2
(45) Date of Patent: Oct. 1, 2024

(54) COMPACT FOLDED LENSES WITH LARGE APERTURES

(71) Applicant: Corephotonics Ltd., Tel-Aviv (IL)

(72) Inventors: Gal Shabtay, Tel Aviv (IL); Ephraim Goldenberg, Ashdod (IL); Michael Dror, Nes Ziona (IL); Roy Rudnick, Tel Aviv (IL); Gil Bachar, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 783 days.

(21) Appl. No.: 17/151,484

(22) Filed: Jan. 18, 2021

(65) Prior Publication Data

US 2021/0165192 A1 Jun. 3, 2021

Related U.S. Application Data

(63) Continuation of application No. 16/310,690, filed as application No. PCT/IB2018/055450 on Jul. 22, 2018, now Pat. No. 10,948,696.

(51) Int. Cl.
*G02B 13/00* (2006.01)
*G02B 9/60* (2006.01)
(Continued)

(52) U.S. Cl.
CPC ........... *G02B 13/0045* (2013.01); *G02B 9/60* (2013.01); *G02B 13/0065* (2013.01);
(Continued)

(58) Field of Classification Search
CPC .. G02B 13/0045; G02B 9/60; G02B 13/0065; G02B 13/002; G02B 13/007;
(Continued)

(56) References Cited

U.S. PATENT DOCUMENTS 2,106,752 A 2/1938 Land
2,354,503 A 7/1944 Arthur
(Continued)

FOREIGN PATENT DOCUMENTS

CN 102193162 A 9/2011
CN 102466865 A 5/2012
(Continued)

OTHER PUBLICATIONS

Sensor and Pixel Sizes of CCD and CMOS Sensor (The Vision Doctor, Feb. 2017, retrieved Jan. 2024, retrieved from Internet Archive: https://web.archive.org/web/20170223044530/https://www.vision-doctor.com/en/camera-technology-basics/sensor-and-pixel-sizes.html) 2017.*

(Continued)

*Primary Examiner* — Joseph P Martinez
*Assistant Examiner* — Ray Alexander Dean
(74) *Attorney, Agent, or Firm* — Nathan & Associates; Menachem Nathan

(57) ABSTRACT

Lens assemblies comprising, from an object side to an image side, a positive first lens element $L_1$ with a first optical axis and a first lens width $W_1$, a light folding element, a negative second lens element $L_2$ and a plurality of additional lens elements $L_3$-$L_N$ with a common second optical axis, and an image sensor having a sensor diagonal length (SDL), wherein the light folding element is configured to fold light from the first optical axis to the second optical axis, wherein the folded lens has an optical height OH, wherein SDL/OH>0.7 and wherein OH/$W_1$<1.1.

28 Claims, 11 Drawing Sheets

(51) Int. Cl.
  *G02B 17/08* (2006.01)
  *G03B 13/32* (2021.01)
  *G03B 17/17* (2021.01)

(52) U.S. Cl.
  CPC .......... *G02B 13/002* (2013.01); *G02B 13/007* (2013.01); *G02B 17/08* (2013.01); *G03B 13/32* (2013.01); *G03B 17/17* (2013.01)

(58) Field of Classification Search
  CPC ........ G02B 17/08; G02B 13/02; G02B 7/021; G02B 9/62; G02B 9/64; G03B 13/32; G03B 17/17; G03B 30/00; H04N 23/55; H04N 23/57; H04N 23/54
  See application file for complete search history.

(56) References Cited

U.S. PATENT DOCUMENTS

| | | |
|---|---|---|
| 2,378,170 A | 6/1945 | Aklin |
| 2,441,093 A | 5/1948 | Aklin |
| 3,388,956 A | 6/1968 | Eggert et al. |
| 3,524,700 A | 8/1970 | Eggert et al. |
| 3,558,218 A | 1/1971 | Grey |
| 3,864,027 A | 2/1975 | Harada |
| 3,942,876 A | 3/1976 | Betensky |
| 4,134,645 A | 1/1979 | Sugiyama et al. |
| 4,338,001 A | 7/1982 | Matsui |
| 4,465,345 A | 8/1984 | Yazawa |
| 5,000,551 A | 3/1991 | Shibayama |
| 5,969,869 A | 10/1999 | Hirai et al. |
| 6,147,702 A | 11/2000 | Smith |
| 6,169,636 B1 | 1/2001 | Kreitzer |
| 6,654,180 B2 | 11/2003 | Ori |
| 7,187,504 B2 | 3/2007 | Horiuchi |
| 7,206,136 B2 | 4/2007 | Labaziewicz et al. |
| 7,515,351 B2 | 4/2009 | Chen et al. |
| 7,564,635 B1 | 7/2009 | Tang |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Iyama |
| 7,738,186 B2 | 6/2010 | Chen et al. |
| 7,777,972 B1 | 8/2010 | Chen et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 8,000,031 B1 | 8/2011 | Tsai |
| 8,004,777 B2 | 8/2011 | Souma |
| 8,077,400 B2 | 12/2011 | Tang |
| 8,149,523 B2 | 4/2012 | Ozaki |
| 8,218,253 B2 | 7/2012 | Tang |
| 8,228,622 B2 | 7/2012 | Tang |
| 8,233,224 B2 | 7/2012 | Chen |
| 8,253,843 B2 | 8/2012 | Lin |
| 8,279,537 B2 | 10/2012 | Sato |
| 8,363,337 B2 | 1/2013 | Tang et al. |
| 8,395,851 B2 | 3/2013 | Tang et al. |
| 8,400,717 B2 | 3/2013 | Chen et al. |
| 8,451,549 B2 | 5/2013 | Yamanaka et al. |
| 8,503,107 B2 | 8/2013 | Chen et al. |
| 8,514,502 B2 | 8/2013 | Chen |
| 8,570,668 B2 | 10/2013 | Takakubo et al. |
| 8,718,458 B2 | 5/2014 | Okuda |
| 8,780,465 B2 | 7/2014 | Chae |
| 8,810,923 B2 | 8/2014 | Shinohara |
| 8,854,745 B1 | 10/2014 | Chen |
| 8,958,164 B2 | 2/2015 | Kwon et al. |
| 9,185,291 B1 | 11/2015 | Shabtay |
| 9,229,194 B2 | 1/2016 | Yoneyama et al. |
| 9,235,036 B2 | 1/2016 | Kato et al. |
| 9,279,957 B2 | 3/2016 | Kanda et al. |
| 9,438,792 B2 | 9/2016 | Nakada et al. |
| 9,488,802 B2 | 11/2016 | Chen et al. |
| 9,568,712 B2 | 2/2017 | Dror et al. |
| 9,678,310 B2 | 6/2017 | Iwasaki et al. |
| 9,817,213 B2 | 11/2017 | Mercado |
| 9,869,846 B1 | 1/2018 | Bone et al. |
| 2002/0118471 A1 | 8/2002 | Imoto |
| 2005/0041300 A1 | 2/2005 | Oshima et al. |
| 2005/0062346 A1 | 3/2005 | Sasaki |
| 2005/0128604 A1 | 6/2005 | Kuba |
| 2005/0141103 A1 | 6/2005 | Nishina |
| 2005/0168840 A1 | 8/2005 | Kobayashi et al. |
| 2005/0270667 A1 | 12/2005 | Gurevich et al. |
| 2007/0229983 A1 | 10/2007 | Saori |
| 2008/0056698 A1 | 3/2008 | Lee et al. |
| 2008/0304161 A1 | 12/2008 | Souma |
| 2009/0002839 A1 | 1/2009 | Sato |
| 2009/0122423 A1 | 5/2009 | Park et al. |
| 2009/0141365 A1 | 6/2009 | Jannard et al. |
| 2009/0225438 A1 | 9/2009 | Kubota |
| 2010/0165476 A1 | 7/2010 | Eguchi |
| 2010/0277813 A1 | 11/2010 | Ito |
| 2011/0001838 A1 | 1/2011 | Lee |
| 2011/0115965 A1 | 5/2011 | Engelhardt et al. |
| 2011/0149119 A1 | 6/2011 | Matsui |
| 2011/0157430 A1 | 6/2011 | Hosoya et al. |
| 2011/0188121 A1 | 8/2011 | Goring et al. |
| 2012/0069455 A1 | 3/2012 | Lin |
| 2012/0092777 A1 | 4/2012 | Tochigi et al. |
| 2012/0105708 A1 | 5/2012 | Hagiwara |
| 2012/0154929 A1 | 6/2012 | Tsai et al. |
| 2012/0229920 A1 | 9/2012 | Otsu et al. |
| 2012/0262806 A1 | 10/2012 | Lin et al. |
| 2013/0057971 A1 | 3/2013 | Zhao et al. |
| 2013/0088788 A1 | 4/2013 | You |
| 2013/0208178 A1 | 8/2013 | Park |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0146216 A1 | 5/2014 | Okumura |
| 2014/0204480 A1 | 7/2014 | Jo et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0116569 A1 | 4/2015 | Mercado |
| 2015/0253543 A1 | 9/2015 | Mercado |
| 2015/0253647 A1 | 9/2015 | Mercado |
| 2015/0373252 A1 | 12/2015 | Georgiev |
| 2015/0373263 A1 | 12/2015 | Georgiev et al. |
| 2016/0044250 A1 | 2/2016 | Shabtay et al. |
| 2016/0062084 A1 | 3/2016 | Chen et al. |
| 2016/0070088 A1 | 3/2016 | Koguchi |
| 2016/0085089 A1 | 3/2016 | Ogino et al. |
| 2016/0187631 A1 | 6/2016 | Choi et al. |
| 2016/0202455 A1* | 7/2016 | Aschwanden ..... G02B 13/0075 359/666 |
| 2016/0291295 A1 | 10/2016 | Shabtay |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0353008 A1 | 12/2016 | Osborne |
| 2017/0102522 A1 | 4/2017 | Jo |
| 2017/0115471 A1 | 4/2017 | Shinohara |
| 2017/0160511 A1 | 6/2017 | Kim et al. |
| 2018/0059365 A1 | 3/2018 | Bone et al. |
| 2018/0217475 A1 | 8/2018 | Goldenberg et al. |

(56) References Cited

U.S. PATENT DOCUMENTS

| | | |
|---|---|---|
| 2018/0224630 A1 | 8/2018 | Lee et al. |
| 2019/0170965 A1 | 6/2019 | Shabtay |

FOREIGN PATENT DOCUMENTS

| | | | | |
|---|---|---|---|---|
| CN | 102466867 | A | | 5/2012 |
| CN | 102147519 | B | | 1/2013 |
| CN | 104297906 | A | | 1/2015 |
| CN | 104898352 | A | * | 9/2015 ............ G02B 1/041 |
| CN | 105467563 | A | | 4/2016 |
| CN | 106680974 | A | | 5/2017 |
| JP | S54157620 | A | | 12/1979 |
| JP | S59121015 | A | | 7/1984 |
| JP | S165212 | A | | 4/1986 |
| JP | S6370211 | A | | 3/1988 |
| JP | 406059195 | A | | 3/1994 |
| JP | 2007133096 | A | | 5/2007 |
| JP | 2007219199 | A | | 8/2007 |
| JP | 2007306282 | A | | 11/2007 |
| JP | 2010164841 | A | | 7/2010 |
| JP | 2012203234 | A | | 10/2012 |
| JP | 2013105049 | A | | 5/2013 |
| JP | 2013106289 | A | | 5/2013 |
| JP | 2014142542 | A | | 8/2014 |
| JP | 2018059969 | A | | 4/2018 |
| KR | 20140135909 | A | | 5/2013 |
| KR | 20140023552 | A | | 2/2014 |
| KR | 20160000759 | A | | 1/2016 |
| WO | 2013058111 | A1 | | 4/2013 |
| WO | 2013063097 | A1 | | 5/2013 |

OTHER PUBLICATIONS

Office Action in related KR Patent Application No. 2021-7031069, dated Nov. 4, 2021.
Office Action in related JP Patent Application No. 2020-136241, dated May 10, 2022.
Office Action in related KR Patent Application No. 202110345483.9, dated Sep. 5, 2022.
A compact and cost effective design for cell phone zoom lens, Chang et al., Sep. 2007, 8 pages.
Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.
Search Report in related EP patent application EP23183501.8, dated Nov. 3, 2023.

* cited by examiner

COMPACT FOLDED LENSES WITH LARGE APERTURES

CROSS REFERENCE TO RELATED APPLICATIONS

This application is a continuation of U.S. patent application Ser. No. 16/310,690 filed Dec. 17, 2018 (now allowed), which was a 371 application from international patent application No. PCT/IB2018/055450 filed Jul. 22, 2018, and claims the benefit of priority of U.S. provisional patent application No. 62/535,926 filed Jul. 23, 2017, which is incorporated herein by reference in its entirety.

FIELD

Embodiments disclosed herein relate to optical lenses, and more particularly, to folded optical lenses.

BACKGROUND

Cameras with folded optics (or simply "folded camera modules" or "folded cameras") are known. In particular, such folded camera modules have been proposed for incorporation in electronic mobile devices such as cellphones or smartphones, e.g. as part of a multiple-camera structure that comprises two or more lens modules, where at least one of the lens modules is "folded". One example is a two-camera structure (also referred to as "dual-camera" or "dual-aperture camera") that may include one or two folded camera modules.

In a folded camera module structure, an optical path folding element (referred to hereinafter as "OPFE"), e.g. a prism or a mirror, is added to tilt the light propagation direction from a first direction (e.g. the direction perpendicular to the phone back surface) to a second direction (e.g. parallel to the phone back surface). If the folded camera module is part of a dual-aperture camera, this provides a folded optical path through one lens module (normally a "Tele" lens module). Such a camera is referred to herein as folded-lens dual-aperture camera or dual-aperture camera with folded lens.

As the dimensions of mobile devices (and in particular the thickness of devices such as smartphones) are being constantly reduced, compact camera dimensions are becoming an increasingly limiting factor on device thickness. Therefore, camera dimensions and in particular folded camera heights and lengths need to be further reduced.

SUMMARY

The presently disclosed subject matter includes various designs of folded cameras with designs of folded lenses that have large camera aperture area, reduced optical height, and that can support an image sensor with a large diagonal size relative to an optical height and in which most lens elements have circular apertures.

In this specification, the known in the art term "total track length" (TTL), which is shown and marked in the figures, is a property of a lens and includes (i.e. is a sum of) two parts $TTL_1$ and $TTL_2$ (see e.g. in FIGS. 1B and 2B): a first part measured along a first optical axis from a light entrance surface of a first lens element to a prism reflective surface, and a second part measured along a second optical axis from the prism reflective surface to an image sensor (e.g. CCD or CMOS sensor). In general, the angle between the first and second optical axes is a 90° angle, however in some examples of other angles, the value of the angle may be less than or greater than 90°. In the examples provided below, the TTL is measured when the lens is focused to infinity and includes a window (e.g. IR filter) positioned between the last lens element and the image sensor, as specified in the design values.

In this specification, the term "total lens length" (TLL), which is shown and marked in e.g. FIG. B, is a property of a lens defined as the distance along the second optical axis direction between an image plane at the image sensor and the furthest vertex of the first optical element. TLL is measured when the lens is focused to infinity and includes a window (e.g. IR filter) positioned between the last lens element and the image sensor, as specified in the design values.

In this specification the known in the art term "back focal length" (BFL), which is shown and marked in e.g. FIG. 1B, is a property of a lens, which defined as the distance along the second optical axis direction between the image plane and the closest point of the last optical element to the image.

In this specification, the known in the art term "effective focal length" (EFL) is a property of a lens which has its regular meaning. EFL is defined as to be equal to the focal length of a single lens element having an equal magnification power as the entire lens (that has a few lens elements).

In this specification, "lens surface aperture" refers to the shape and size of a maximum optically useable lens element surface, i.e. all the surface with a sag defined by a lens formula. "Lens element apertures" or "lens apertures" refer to front and back surfaces of the lens. "Camera aperture" or "lens assembly aperture" refers to the lens aperture of the first lens element object side surface that is open to incoming light rays.

In this specification, each lens is designed for an image sensor having a sensor diagonal length (SDL) given in mm. SDL/2 is half of the sensor diagonal length. All sensors having SDL specified may be used with the combination of the given lens examples disclosed herein, e.g. sensors having 3:4 or 9:16 or 1:2 width-to-height ratio, etc.

In various exemplary embodiments, there are provided folded lens assemblies comprising, from an object side to an image side: a positive first lens element $L_1$ with a first optical axis and a first lens width $W_1$, a light folding element, a negative second lens element $L_2$ and a plurality of additional lens elements $L_3$-$L_N$ with a common second optical axis, and an image sensor having a sensor diagonal length SDL, wherein the light folding element is configured to fold light from the first optical axis to the second optical axis, wherein each folded lens assembly has an optical height OH, wherein SDL/OH>0.7 and wherein OH/$W_1$<1.1.

In an embodiment, SDL/OH>1.

In an embodiment, OH/$W_1$<1. In an embodiment, OH/$W_1$<0.95.

In an embodiment, BFL/TTL>0.2. In an embodiment, BFL/TTL>0.35.

In an embodiment, the first lens element has a length $A_1$ such that OH/$A_1$<1.4. In an embodiment, OH/$A_1$<1.1.

In an embodiment, the second lens element $L_2$ may have circular aperture.

In an embodiment, a lens assembly includes at least two air gaps between lens elements that comply with the condition STD<0.020, where STD is a normalized gap standard deviation and $r_{norm}$ is a minimum value of half a gap between adjacent surfaces $L_iS_2$ and $L_{i+1}S_1$. In an embodiment with at least two air gaps, STD<0.010.

In an embodiment, a lens assembly includes at least three air gaps between lens elements that comply with the condition STD<0.035. In an embodiment with at least three air gaps, STD<0.015.

In an embodiment, a lens assembly includes at least four air gaps between lens elements that comply with the condition STD<0.050. In an embodiment with at least four air gaps, STD<0.025

In some embodiments, a lens assembly includes, from the object side to the image side five lens elements, with a first element having positive refractive power, a second lens having negative refractive power and any one of the other elements having either positive or negative refractive power. For example, the power sign sequence of the lens elements may be PNPPN or PNPNP, where P refers to a positive lens element power and N refers to a negative lens element power.

In an embodiment, a lens assembly includes at least one air gap between lens elements that complies with the conditions STD<0.01 and OA_Gap/TTL<1/80, where OA_Gap is an on-axis gap. In an embodiment, STD<0.01 and OA_Gap/TTL<1/65.

In some embodiments, the first and second lens elements and a third lens element have respective Abbe numbers larger than 50, smaller than 30 and larger than 50.

In some embodiments, the second lens element and a third lens element have together a negative effective focal length.

In some embodiments, the first lens element has a focal length $f_1$ and $f_1/EFL<0.7$. In an embodiment, $f_1/EFL<0.6$. In an embodiment, the second lens element has a focal length $f_2$ and $|f_2/f_1|<1$. In an embodiment, $|f_2/f_1|<0.7$.

In some embodiments, lens elements $L_2$ to $L_N$ have circular apertures.

In some embodiments, TTL/EFL<1.1.

In an embodiment, the apertures of the first lens element are cut along the second optical axis.

In an embodiment, TLL/EFL<1.

In various exemplary designs, the optical powers of the first two lens elements $L_1$ and $L_2$ are significant contributors to the lens system low OH/$W_1$ and TTL/EFL ratios. This is achieved by the low (<0.6) $f_1$/EFL ratio and also the low (<1) absolute value of the $f_2/f_1$ ratio. The high (>50) and low (<30) Abby numbers of respectively $L_1$ and $L_2$ also contribute to reduce the lens system chromatic aberration. The $L_3$ to $L_N$ lens elements contribute manly to reduction of aberrations (e.g. spherical, distortion, field curvature, etc.). The close proximity or small gaps between lens elements that results in a large (>0.2) BFL/TL ratio contributes to the lens system supporting a large SDL/OH ratio.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein and should not be considered limiting in any way. In the drawings.

DETAILED DESCRIPTION

Figure 1A:
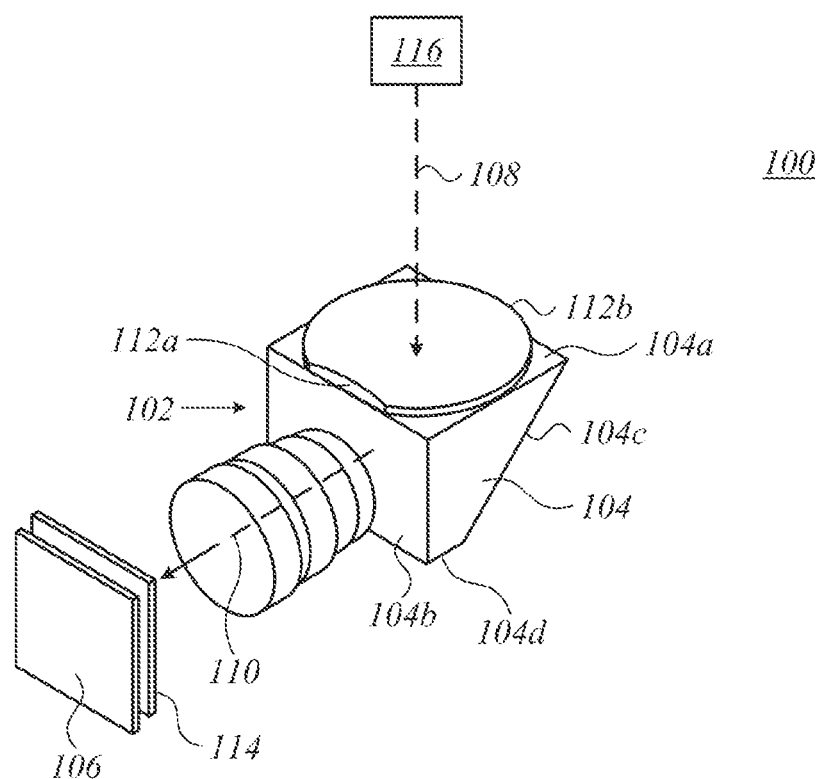
FIG. 1A shows a first embodiment of a folded camera, comprising an optical lens assembly disclosed herein in an isometric view.
Figure 1B:
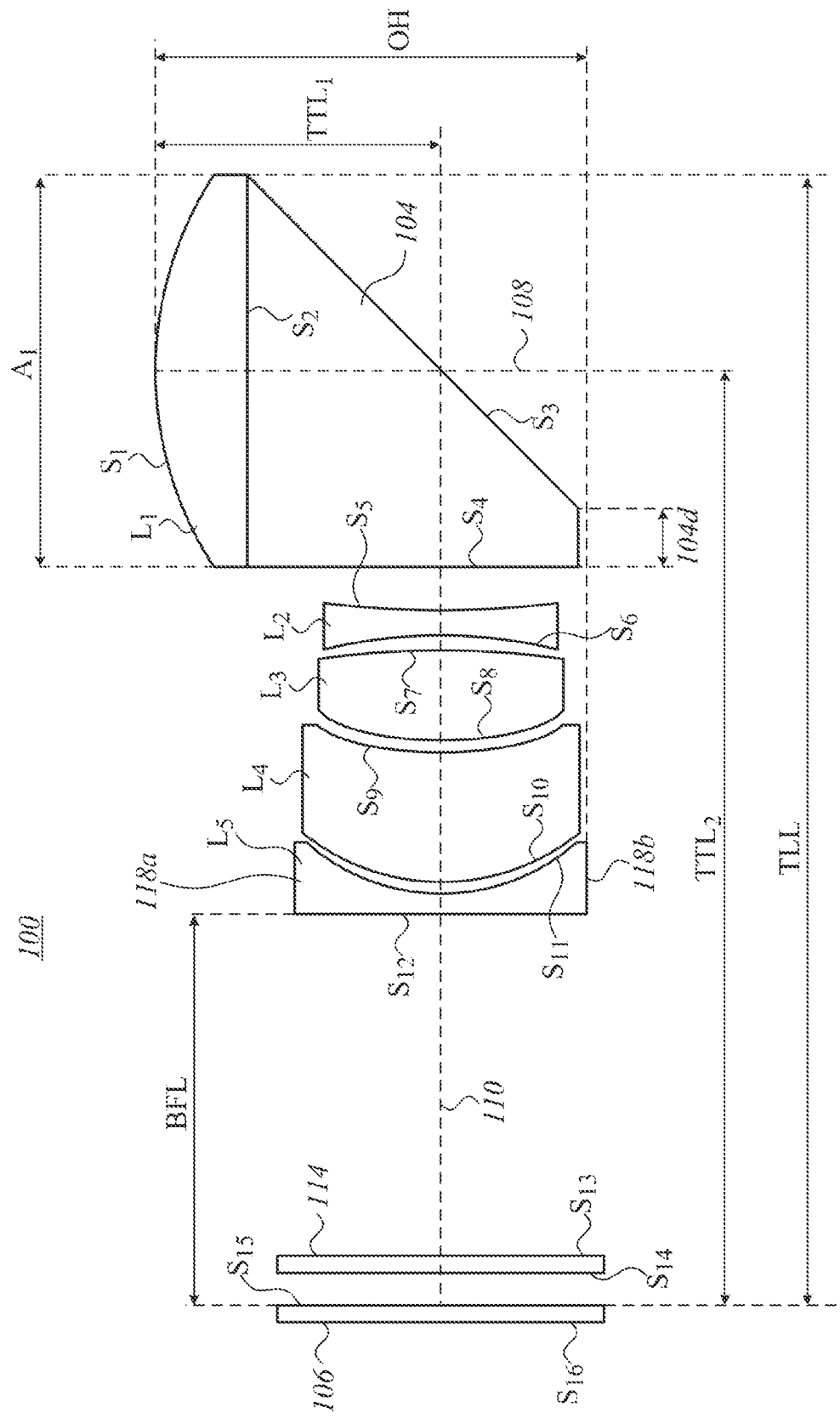
FIG. 1B shows the camera of FIG. 1A from a side view.
Figure 1C:
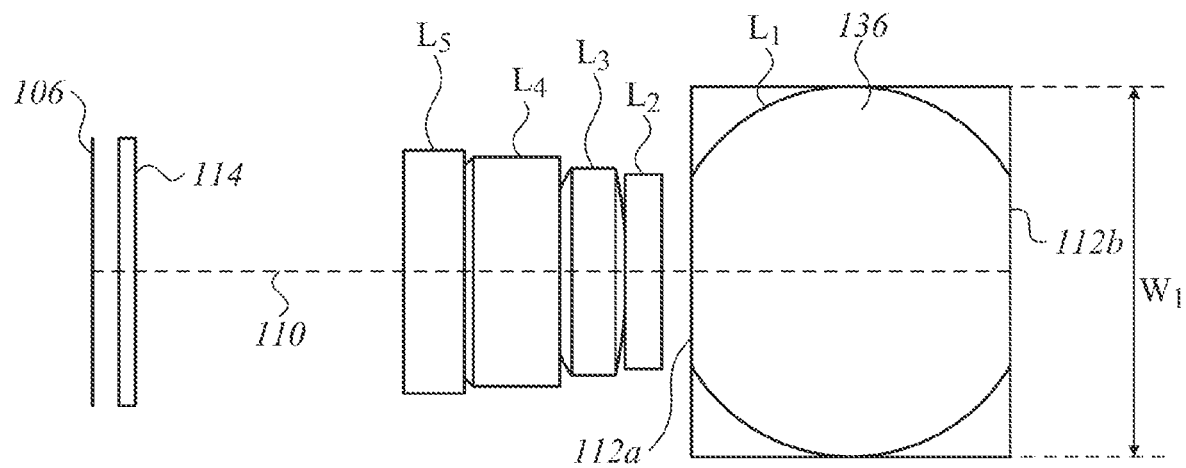
FIG. 1C shows the camera of FIG. 1A from a top view.
Figure 1D:
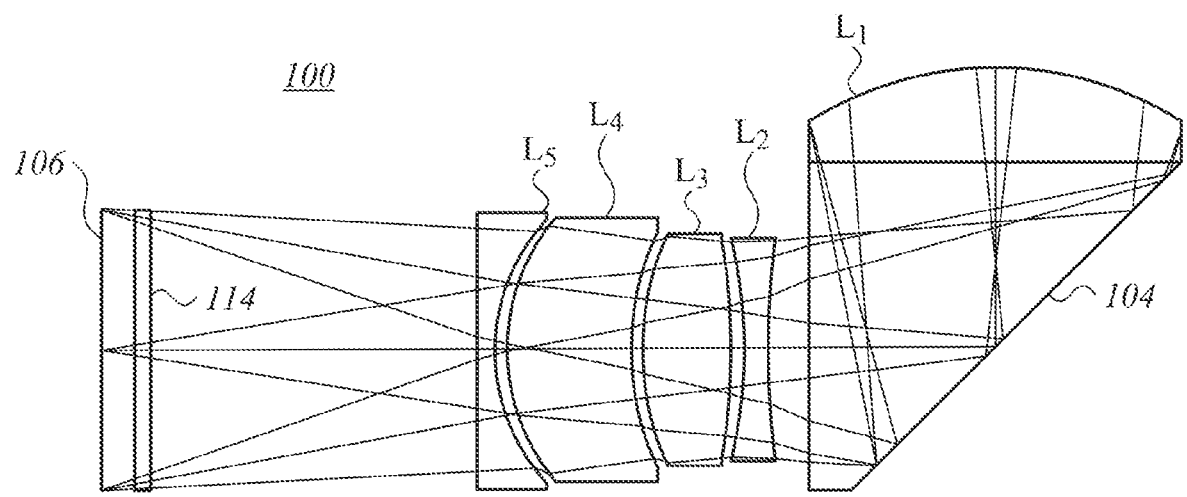
FIG. 1D shows the camera of FIG. 1A with light ray tracing from an object to an image sensor.

FIGS. 1A-1C show a first exemplary embodiment (also referred to as "Example 1") of a folded camera disclosed herein and numbered 100. FIG. 1A shows embodiment 100 in an isometric view, FIG. 1B shows embodiment 100 in a side view and FIG. 1C shows embodiment 100 in a top view. The element numbers in FIG. 1A apply also to FIGS. 1B and 1C.

Folded camera 100 comprises a folded lens assembly (also simply referred to as "folded lens") 102 and an image sensor 106. Optionally, camera 100 may comprise a window (e.g. glass window) 114 that may serve for example as a dust cover for the image sensor and/or to filter infra-red (IR) light and prevent the IR light from reaching image sensor 106. In an embodiment, folded lens assembly 102 comprises, in order from an object side to an image side, a first lens element $L_1$, a light folding element (exemplarily a prism) 104, and a plurality of lens elements $L_2 \ldots L_N$. In total, lens assembly 102 includes a plurality of N lens elements, for example (as in this embodiment) five lens elements marked $L_1, L_2, L_3, L_4$ and $L_5$. In other embodiments, a lens assembly may include another number of elements, for example N=4, 6 or 7, wherein the design principles disclosed herein with respect to five lens elements can be maintained with other (e.g. greater) number of lens elements. In general, $L_i$ will mark the $i^{th}$ lens element of any lens, where "i" is an integer between 1 and N. Each lens element $L_i$ has an optical axis. Lens element $L_1$ has an optical axis (also referred to as "first optical axis") 108. Lens elements $L_2 \ldots L_N$ have a common optical axis (also referred to as "second optical axis") 110. Prism 104 folds light arriving from an object or scene 116 and passing through lens element $L_1$ along a first optical path substantially parallel to first optical axis 108, to a second optical path substantially parallel to second optical axis 110 toward image sensor 106. Prism 104 has a light entering surface (or "plane") 104a, a light exiting surface (plane) 104b and a light folding surface (plane) 104c. First optical axis 108 and second optical axis 110 intersect on plane 104c. In an example, prism light exiting surface 104b is smaller than prism light entering surface 104a, i.e. the diameter of light exiting surface 104b is smaller than the diameter of light entering surface 104a. This feature allows the prism to be lower (have lower height) than the case of equal diameter of light entering and exiting surfaces. Thus, the optical height (OH, see FIG. 1B and definition below) of lens 102 can be reduced. According to some examples described herein, the ratio between the prism light exiting surface and the prism light entering surface dimensions can be less than 1.00.

Each lens element $L_i$ has a respective focal length $f_i$, given in Table 1 for all lens elements of all examples in this specification. Each lens element $L_i$ has a respective height $H_i$ measured along the direction of the first optical axis, see e.g. FIG. 1F.

Each lens element $L_i$ has a respective front surface $L_iS_1$ and a respective rear surface $L_iS_2$ where "i" is an integer between 1 and N. As used herein, the term "front surface" of each lens element refers to the surface of a lens element located closer to the entrance of the camera (camera object side) and the term "rear surface" refers to the surface of a lens element located closer to the image sensor (camera image side). The front surface and/or the rear surface can be in some cases aspherical. The front surface and/or the rear surface can be in some cases spherical. These options are, however, not limiting. Lens elements $L_1$ to $L_N$ may be made from various materials, for example plastic or glass. Some lens elements may be made of different materials than other lens elements.

In the case of camera 100, $L_1S_2$ is the same surface as the prism light entering surface 104a. However, in other cases there can be an air gap between the two surfaces (not shown). In the case of camera 100, $L_1$ and the prism are made as two parts which are fixedly attached (e.g. glued) to each other. In other cases, they may be made as one part, e.g. by taking a prism and polishing its entrance surface to have optical power and serve as a lens. The optical design of the lens for such a case ($L_1$ and prism as one part) may be identical to the design of lens 102, in which $L_1S_2$ which has no optical power. In camera 100, $L_1$ and the prism are made of the same material. In other embodiments, they may be made of different materials.

$L_1$ has two surfaces ($L_1S_1$, $L_1S_2$), having two apertures that include two cuts (facets) 112a and 112b. Therefore, lens element $L_1$ is referred to as a "cut lens". The cuts enable the lens assembly to be lower and/or shorter, as shown in the drawings. The cuts in $L_1$ allow shortening the prism entrance surface and thereby the shortening of TLL. The shortening of the prism entrance surface also allows lowering of the prism exit surface and thereby the lowering of the optical height.

The aperture of $L_1S_1$ is referred to herein as a "cut aperture". As illustrated by way of example in FIG. 1B, the length of $L_1$ (denoted $A_1$) is measured along the second optical axis direction, between cuts 112a and 112b. As further illustrated by a way of example in FIG. 1C, the width of $L_1$ (denoted $W_1$) is measured along a direction perpendicular to both directions of the first and second optical axes. $A_1$ and $W_1$ are likewise applied to all other examples provided herein.

Detailed optical data of camera 100 (Example 1) and of lens assembly 102 are given in Tables 2-4. R is the radius of curvature of a surface and T is the distance from the surface to the next surface along an optical axis. D is the optical diameter of the surface. D/2 expresses a "semi-diameter" or half of the diameter. The units of R, T, D, A and W are in millimeters (mm). Nd and Vd are respectively the refraction index and Abbe number of the lens element material residing between the surface and the next surface. "Offset" in various Tables (given in mm) is the displacement from the optical axis, information required for reconstructing a prism in optical design software. "Type" in Table 1 has the common meaning well known in the art.

Surface types are defined in Tables 2 and the coefficients for the surfaces are in Table 3:
Standard Surfaces;
Aspherical surfaces, which are defined using Eq. 1 and their details given in table 4:

$$SAG = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} \quad \text{(Eq. 1)}$$

where r is the distance of a point in the optical surface from (and perpendicular to) the relevant optical axis (first or second), k is the conic coefficient, c=1/R, and a are coefficients given in Table 4. In the equation above as applied to lens 102 in folded camera 100, coefficients $\alpha_1$ and $\alpha_4$ to $\alpha_7$ are zero Note that, for any aspheric surface, the maximum value of r ("max r") is the semi-diameter (D/2) of the respective surface.

A "stop", i.e. a surface that can block a portion of the light from reaching the image sensor, as known in the art. Stops are common in optical design. A stop may help to reduce stray light and improve optical quality of the image. The position of the stop surface in lens 102 (between the prism and $L_2$) is exemplary. In other embodiments, one or more stops may be located between other elements or even before L1. Yet other embodiments may not include a "stop".

The reflective surface of the prism, also commonly known as a "mirror".

In this specification, "height" of a part, an element, or of a group of parts or elements is defined as a distance in the direction of the first optical axis (Y direction in an exemplary coordinate system) between the lowermost point of the part/element/group and the upper-most point of the part/element/group. The term "upper" or "top" refers to a section of any part/element/group that is closer to and facing an imaged (photographed) object (e.g. object 116) along Y relative to other sections of the same part/element or group. The term "lower" or "bottom" refers to a section of any part/element/group that is farthest from and facing away from an imaged object along Y relative to other sections of the same part/element or group. For example, as seen in FIG. 2B, the height of $L_5$ is the distance from a bottom-most part 118a of $L_5$ to a top-most part 118b of $L_5$ along the Y direction. The optical height (OH) of folded lens 102 (marked in FIG. 1B) is defined as the distance from the lowest of the bottom-most part of any of lens elements $L_2$ ... $L_N$ and prism 104 to the top-most part of lens element $L_1$. For example, the optical height of folded lens 102 is measured from the bottom-most part of lens $L_5$ as this lens has the largest diameter. In this specification, $f_i$ will denote the focal length of lens element $L_i$. According to some examples, the following relationships holds: $|f_1|>|f_3|>|f_2|$. According to some examples, the following relationships holds: $|f_3|>|f_1|>|f_2|$. According to some examples, $|f_3|>|f_2|>|f_1|$.

A known definition of F-number (F #) of a lens is the ratio of the lens effective focal length (EFL) to the diameter of the entrance pupil (d).

In this application, in some cases the entrance pupil is not circular. In such cases, d is replaced by an "equivalent" circular entrance pupil diameter of de given by:

$$d_e = \sqrt{4 \cdot \text{entrance pupil area}/\pi} \quad \text{(Eq. 2)}$$

and then $$F\# = \frac{EFL}{d_e} \quad \text{(Eq. 3)}$$

In this specification, a "gap" or an "air gap" refers to the space between consecutive lens elements. In the case of lens elements 1 and 2, it refers to the air space between the prism exit surface and the first surface of lens 2.

A number of functions and constants per gap are defined:
1. A "$Gap_i(r)$" function, (where i is the lens element number and r is the same variable used in Eq. 1) is:
  a) for i=1: $Gap_i(r)$=SAG(r) of $L_2S_1$+(the distance along the second optical axis between the prism exit surface and $L_2S_1$);
  b) for i>1: $Gap_i(r)$=SAG(r) of $L_{i+1}S_1$+(the distance along the second optical axis between $L_iS_2$ and $L_{i+1}S_1$)−SAG(r) of $L_iS_2$;
  c) for r=0, an "on-axis gap" ($OA\_Gap_i$) is defined as $Gap_i(r=0)$;
2. A "gap average" ($AVG_i$) constant is given by:

$$AVG_i = \frac{1}{N}\sum_{j=0}^{N} Gap_i\left(\frac{j \cdot r_{norm}}{N}\right) \quad \text{(Eq. 4)}$$

where j is a discrete variable that runs from 0 to N, where N is an integer>10, and where $r_{norm}$ is the minimum value D/2 of surfaces $\{L_iS_2, L_{i+1}S_1\}$.

3. A normalized gap standard deviation ($STD_i$) constant is given by:

$$STD_i = \frac{1}{r_{norm}}\sqrt{\frac{1}{N}\sum_{j=0}^{N}\left(Gap_i\left(\frac{j \cdot r_{norm}}{N}\right) - AVG_i\right)^2} \quad \text{(Eq. 5)}$$

where $r_{norm}$ the minimum value D/2 of surfaces $\{L_iS_2, L_{i+1}S_1\}$, N is an integer>10, and $AVG_i$ is defined as in (Eq. 4).

TABLE 1

| | Ex 1 | Ex 2 | Ex 3 | Ex 4 | Ex 5 | Ex 6 | Ex 7 |
|---|---|---|---|---|---|---|---|
| F# | 2.73 | 2.63 | 2.75 | 2.75 | 2.75 | 2.75 | 2.75 |
| EFL [mm] | 14.947 | 14.956 | 15.00 | 14.960 | 14.958 | 14.961 | 14.967 |
| TTL [mm] | 15.05 | 15.61 | 14.77 | 14.60 | 14.62 | 14.79 | 14.45 |
| TLL [mm] | 13.85 | 14.31 | 13.56 | 13.25 | 13.26 | 13.43 | 13.13 |
| BFL [mm] | 4.751 | 4.515 | 5.500 | 5.275 | 5.374 | 5.297 | 5.457 |
| TTL/EFL | 1.006 | 1.043 | 0.984 | 0.975 | 0.977 | 0.988 | 0.965 |
| BFL/TTL | 0.315 | 0.289 | 0.372 | 0.361 | 0.367 | 0.358 | 0.377 |
| $A_1$ [mm] | 4.8 | 5.7 | 4.7 | 4.7 | 4.7 | 4.7 | 4.7 |
| $W_1$ [mm] | 5.7 | 5.7 | 5.7 | 5.7 | 5.7 | 5.7 | 5.7 |
| $W_1/TTL_1$ | 1.583 | 1.373 | 1.599 | 1.538 | 1.536 | 1.538 | 1.549 |
| SDL [mm] | 5.86 | 5.86 | 5.86 | 5.86 | 5.86 | 5.86 | 5.86 |
| $D(L_NS_2)$/SDL | 0.607 | 0.512 | 0.619 | 0.617 | 0.616 | 0.617 | 0.615 |
| OH [mm] | 5.38 | 6.05 | 5.37 | 5.51 | 5.51 | 5.51 | 5.48 |
| $OH/W_1$ | 0.943 | 1.061 | 0.942 | 0.967 | 0.968 | 0.967 | 0.962 |
| $OH/A_1$ | 1.120 | 1.061 | 1.142 | 1.173 | 1.174 | 1.173 | 1.167 |
| SDL/OH | 1.089 | 0.968 | 1.091 | 1.063 | 1.063 | 1.063 | 1.069 |
| $f_1$ [mm] 0.587 μm | 8.87 | 9.66 | 8.72 | 9.38 | 9.36 | 8.94 | 9.13 |
| $f_2$ [mm] 0.587 μm | −5.20 | −5.13 | −5.86 | −9.26 | −8.68 | −6.13 | −7.17 |
| $f_3$ [mm] 0.587 μm | 6.94 | 5.91 | 36.00 | −6855.9 | −8587.8 | 4.92 | 18.32 |
| $f_4$ [mm] 0.587 μm | 6.38 | 6.03 | 7.40 | 8.70 | −11.26 | −14.95 | −6.59 |
| $f_5$ [mm] 0.587 μm | −4.81 | −4.32 | −11.30 | −10.76 | 8.17 | −12.24 | 6.72 |
| $f_1$/EFL | 0.593 | 0.646 | 0.581 | 0.627 | 0.626 | 0.598 | 0.610 |
| $|f_2/f_1|$ | 0.586 | 0.530 | 0.672 | 0.987 | 0.926 | 0.685 | 0.785 |
| TTL/OA_$Gap_1$ | 27.870 | 41.696 | 131.937 | 150.447 | 149.100 | 138.803 | 146.802 |
| TTL/OA_$Gap_2$ | 86.450 | 128.449 | 254.474 | 278.606 | 279.280 | 50.084 | 258.256 |
| TTL/OA_$Gap_3$ | 97.510 | 101.485 | 35.102 | 29.309 | 38.463 | 291.430 | 26.310 |
| TTL/OA_$Gap_4$ | 99.554 | 100.425 | 58.416 | 134.274 | 111.851 | 71.467 | 126.195 |
| $STD_1$ | 0.022 | 0.022 | 0.007 | 0.003 | 0.004 | 0.013 | 0.007 |
| $STD_2$ | 0.014 | 0.004 | 0.011 | 0.028 | 0.018 | 0.038 | 0.001 |
| $STD_3$ | 0.001 | 0.003 | 0.056 | 0.078 | 0.056 | 0.032 | 0.049 |
| $STD_4$ | 0.013 | 0.014 | 0.026 | 0.012 | 0.014 | 0.031 | 0.013 |

Example 1

TABLE 2

| # | Type | | R [mm] | T [mm] | Nd | Vd | A/2 [mm] | W/2 [mm] |
|---|---|---|---|---|---|---|---|---|
| $S_1$ | $L_1S_1$ | Aspheric - Stop | 4.326 | 1.200 | 1.487 | 70.405 | 2.400 | 2.850 |
| $S_2$ | $L_1S_2$ | Prism Entrance | Infinity | 2.400 | 1.487 | 70.405 | 2.400 | 2.850 |
| $S_3$ | | Prism Reflective face | Infinity | −2.400 | 1.487 | 70.405 | — | — |
| $S_4$ | * | Prism Exit | Infinity | −0.540 | | | 2.100 | 2.850 |

* the prism exit surface includes a −0.3 mm offset.

TABLE 3

| # | | Type | R [mm] | T [mm] | Nd | Vd | D/2 [mm] |
|---|---|---|---|---|---|---|---|
| $S_5$ | $L_2S_1$ | Aspheric | 7.502 | −0.296 | 1.639 | 23.523 | 1.450 |
| $S_6$ | $L_2S_2$ | Aspheric | −6.089 | −0.174 | | | 1.400 |
| $S_7$ | $L_3S_1$ | Aspheric | −5.811 | −1.105 | 1.534 | 55.664 | 1.500 |
| $S_8$ | $L_3S_2$ | Aspheric | 9.627 | −0.154 | | | 1.500 |
| $S_9$ | $L_4S_1$ | Aspheric | 10.940 | −1.600 | 1.639 | 23.523 | 1.500 |
| $S_{10}$ | $L_4S_2$ | Aspheric | 3.143 | −0.151 | | | 1.700 |
| $S_{11}$ | $L_5S_1$ | Aspheric | 2.344 | −0.273 | 1.534 | 55.664 | 1.700 |
| $S_{12}$ | $L_5S_2$ | Aspheric | 27.026 | −4.151 | | | 1.800 |
| $S_{13}$ | | Standard | Infinity | −0.210 | 1.516 | 64.167 | 2.900 |
| $S_{14}$ | | Standard | Infinity | −0.400 | | | 2.950 |
| $S_{15}$ | | Standard | Infinity | 0.000 | | | 3.030 |

TABLE 4

| # | k | $\alpha_2$ | $\alpha_3$ |
|---|---|---|---|
| $S_1$ | −0.305 | 6.77E−05 | 3.27E−06 |
| $S_5$ | 15.881 | −1.26E−02 | −1.55E−02 |
| $S_6$ | 6.600 | 1.35E−02 | −5.89E−03 |
| $S_7$ | −7.648 | 2.29E−02 | −4.61E−03 |
| $S_8$ | 26.734 | 4.59E−02 | −4.28E−03 |
| $S_9$ | 26.996 | 4.53E−02 | −1.64E−03 |
| $S_{10}$ | −0.292 | 1.60E−02 | −5.36E−04 |
| $S_{11}$ | −0.336 | 8.70E−04 | −1.26E−03 |
| $S_{12}$ | 3.075 | −4.34E−03 | 6.15E−04 |

According to one example, in camera 100, the length $A_1$ (denoted in the figure as 128) of $L_1$ is 4.80 mm, while its width $W_1$ is 5.7 mm, the length being smaller than the width because of cuts 112a and 112b. TLL is 13.85 mm and EFL is 15 mm. $TTL_1$ is 11.45 mm. $TTL_2$ is 3.60 mm. TTL (i.e. $TTL_1+TTL_2$) is therefore 15.05 mm. The optical height OH is 5.38 mm. To further decrease OH, prism 104 can have a flat surface 104d parallel to light entering plane 104a and intersecting exit plane 104b and light folding plane 104c. The apertures of $L_1$ are cut along the second optical axis 110. The apertures of $L_2$, $L_3$, $L_4$ and $L_5$ are circular. Note that in some embodiments, some of the apertures of $L_2$, $L_3$, $L_4$ and $L_5$ may also have cuts.

In lens 102, $L_1$ is a positive (i.e. with positive refractive optical power) lens element. $L_2$ is a negative (i.e. with negative refractive optical power) lens element. This holds true also for all other embodiments (i.e. Examples 2-7) disclosed herein. Lens elements $L_5$ to $L_n$ may have any sign. In example 100. $L_3$ is positive, $L_4$ is positive and $L_5$ is negative. In other examples given here, $L_3$ is positive, $L_4$ is negative and $L_5$ is positive. In yet other examples given here, L3 is negative, $L_4$ is negative and $L_5$ is positive. Given the description and values listed above, it is evident that the optical height (5.38 mm) is smaller than 1.2×$A_1$ (4.80 mm)=5.76 mm, that the ratio TTL/EFL=1.0033 (smaller than 1.2 and even than 1.1) and that TLL/EFL<1. According to some examples (see below), TTL/EFL<1.

Figure 1E:
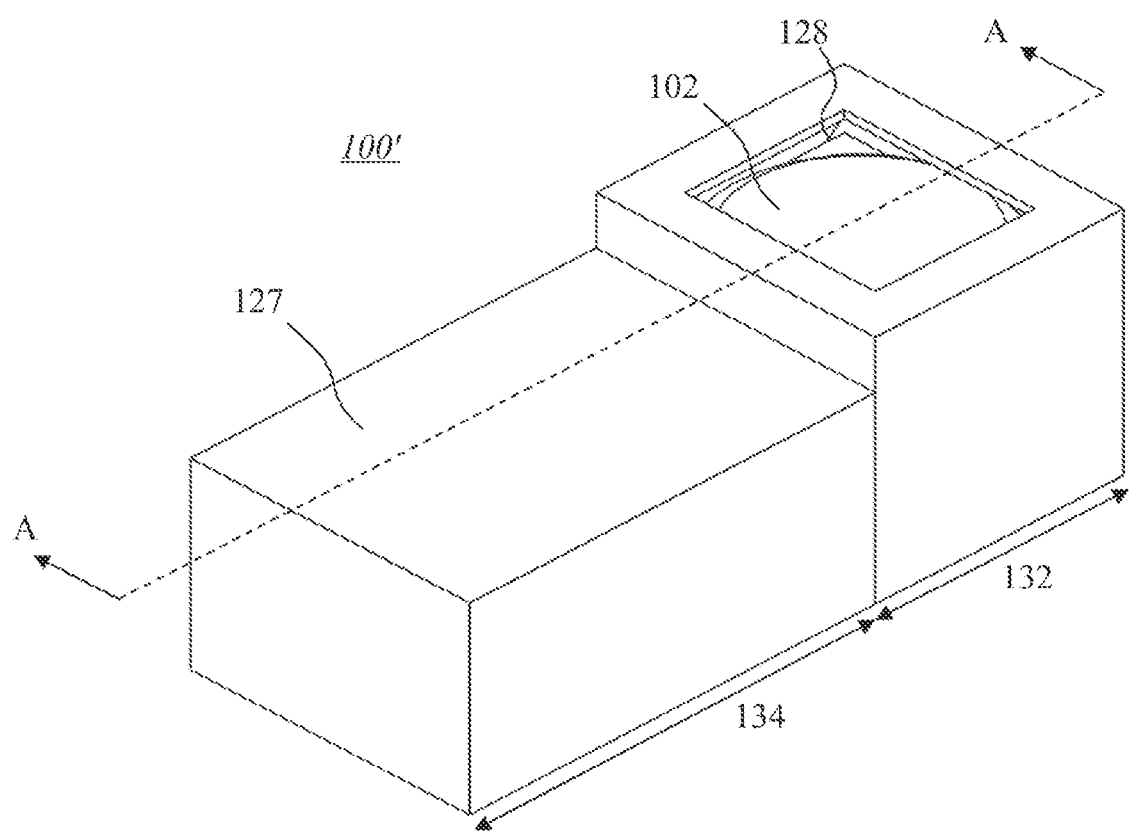
FIG. 1E shows the camera of FIG. 1A in a housing.
Figure 1F:
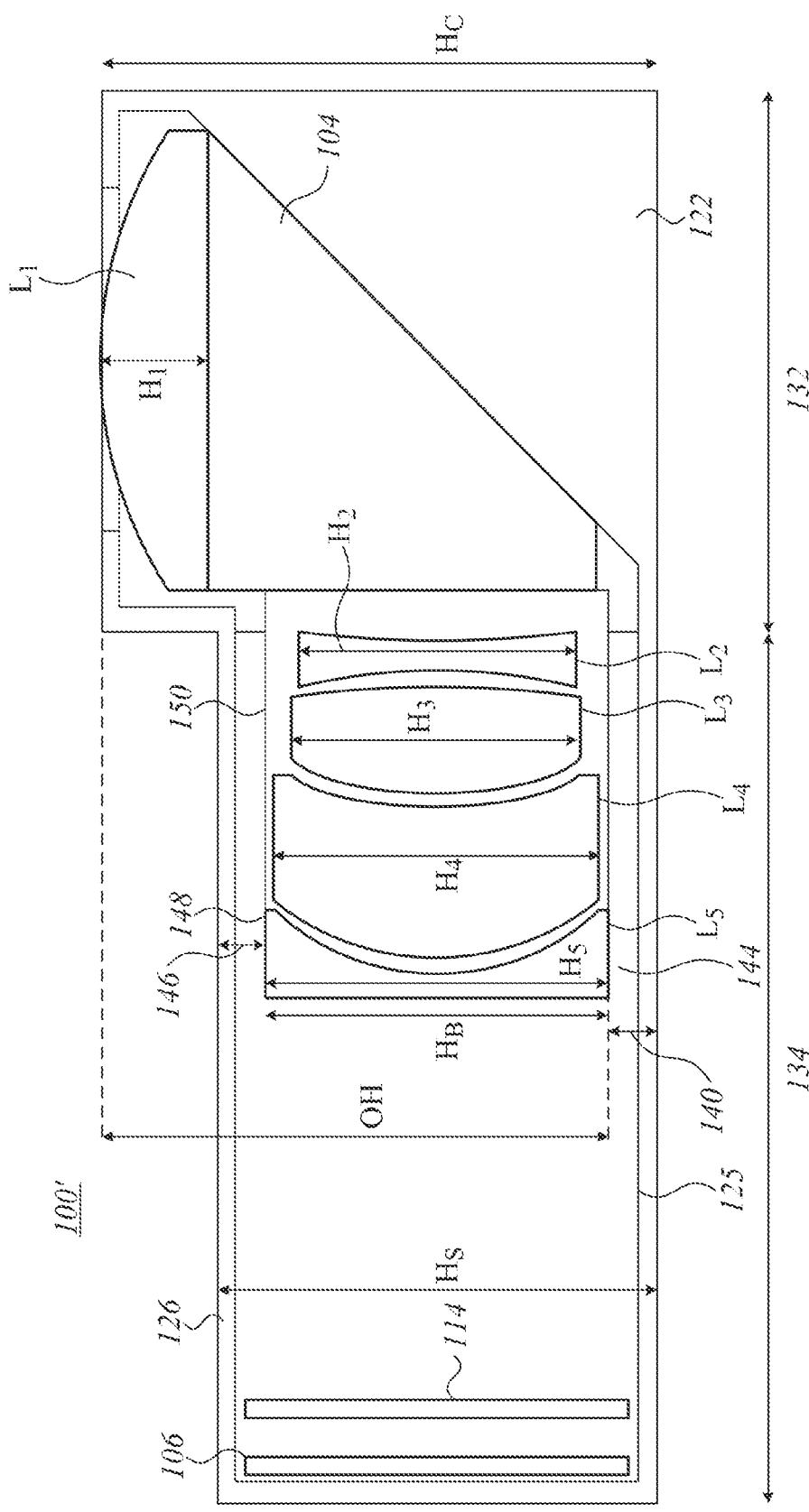
FIG. 1F shows a side cut of the camera of FIG. 1E.

FIG. 1E shows a folded camera 100' like camera 100 housed in a housing 127. FIG. 1F shows a cut along a line A-A in FIG. 1E. Housing 127 may be used to protect optical elements from dust and mechanical damage. Housing 127 include an opening 128. Light can enter lens 102 through opening 128. In camera 100', lens elements $L_2$ to $L_N$ are housed in a lens barrel 150. Lens barrel 150 can be used for example for mechanical protection, to prevent unwanted light entering the lens, and for mechanical alignment of lens elements $L_2$-$L_N$. A height $H_C$ of camera 100' is defined as the height from the lower most point of camera 100' to the highest point of camera 100'. He may be substantially equal to the optical height OH plus a "penalty" 140. Penalty 140 may be equal to the thickness of a bottom shield 125 (which is part of housing 127) and an air gap 144. Air gap 142 may be required for the actuation of lens 102 (see below). In an example, bottom shield 125 may be 50-150 μm thick and air gap 144 may be 50-150 μm wide. Thus, in some examples, $H_C$ may be equal to optical height OH plus 100 μm, or to OH plus 200 μm, or to OH plus 300 μm.

In addition to $H_C$, in some cases, camera 100' may have uneven height. That is, a section 132 of camera 100' may have higher height than a section 134. In some example, section 132 may include lens element $L_1$ and prism 104, while section 134 may include lens elements $L_2$ to $L_N$, and barrel 150. A lower part of camera 100' (section 134) is referred as "camera shoulder", and a shoulder height is marked $H_S$. Height $H_S$ may be substantially equal to the height of barrel 150 (marked $H_B$) plus a penalty 140 plus a penalty 146. Penalty 146 may be equal to the thickness of a top shield 126 (which is part of a housing 122) and an air gap 148. Air gap 148 may be required for the actuation of lens 102 (see below). In an example, top shield 126 may be 50-150 μm thick and air gap 148 may be 50-150 μm wide. Thus, in some examples, $H_S$ may be equal to the Ha plus 250 μm, or to OH plus 300 μm, or OH plus 500 μm.

Housing 122 may further comprise an actuator that may move (actuate, shift) folded lens 102 for focusing (or auto focusing—"AF") and optical image stabilization (OIS). Focusing may be performed by shifting lens 102 relative to image sensor 108 along second optical axis 110. OIS may be performed by shifting lens 102 along the two axes perpendicular to second optical axis 110.

Figure 2A:
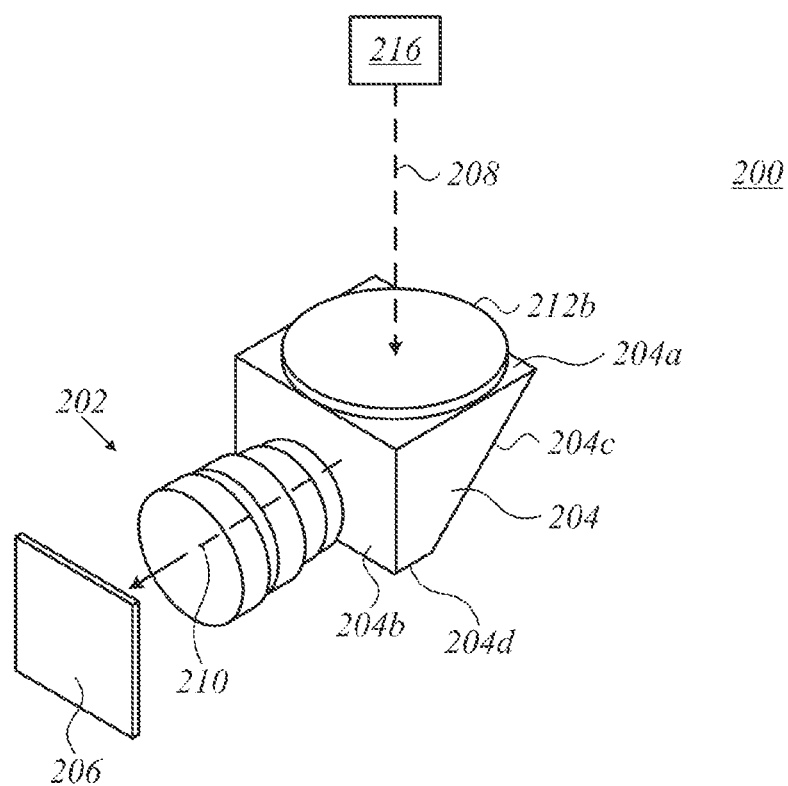
FIG. 2A shows a second embodiment of a folded camera, comprising an optical lens assembly, disclosed herein in an isometric view.
Figure 2B:
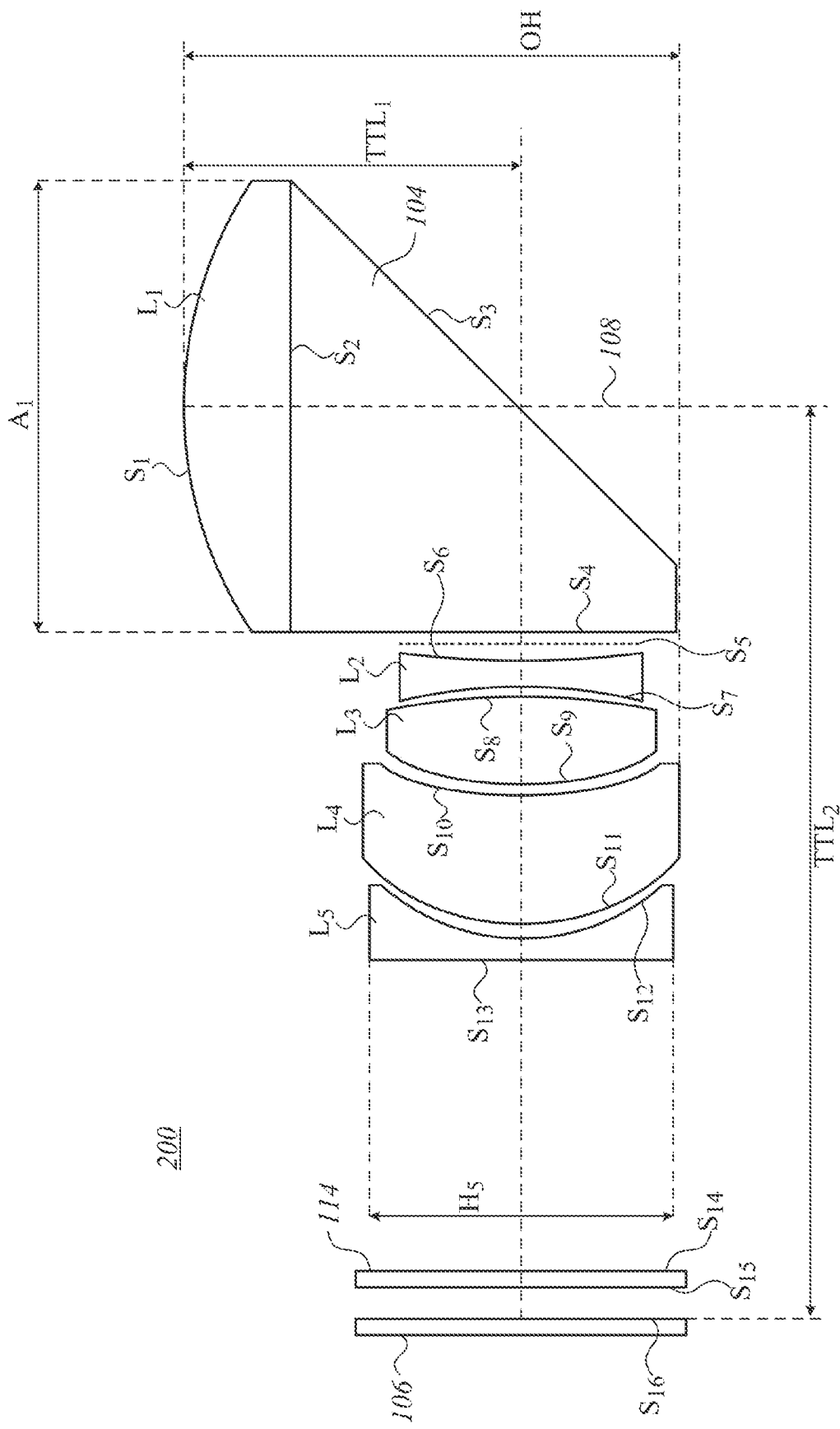
FIG. 2B shows the folded camera of FIG. 2A from a side view.
Figure 2C:
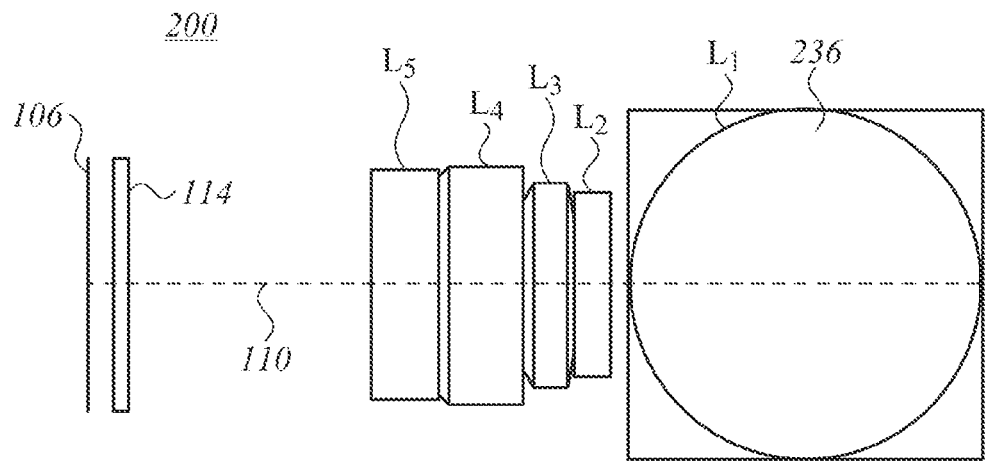
FIG. 2C shows the folded camera of FIG. 2A from a top view.
Figure 2D:
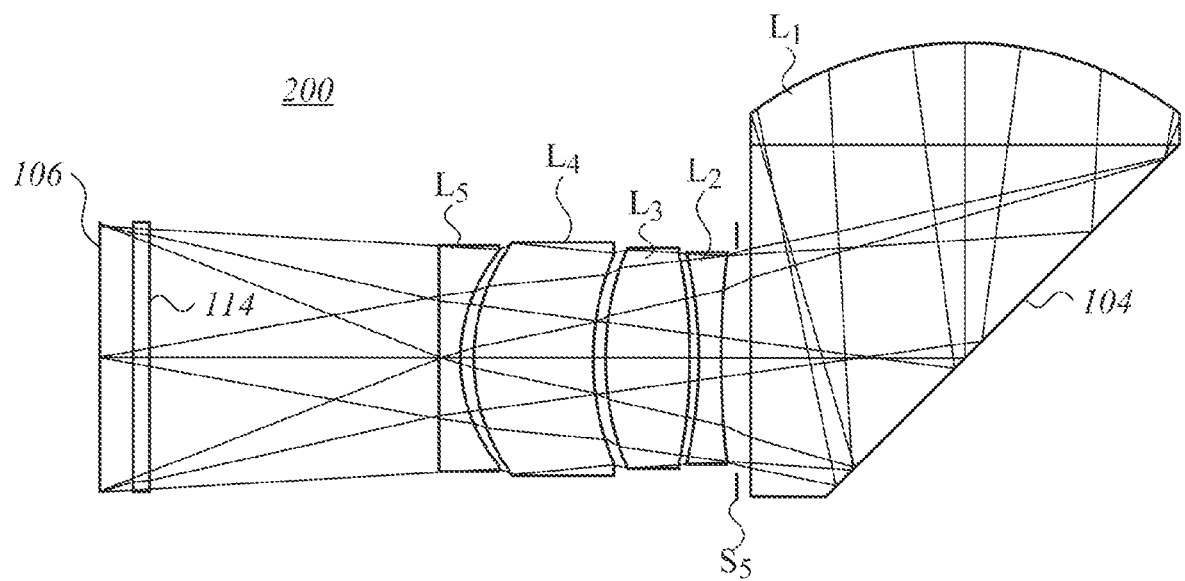
FIG. 2D shows the camera of FIG. 2A with light ray tracing from an object to an image sensor.

FIGS. 2A-2C show a second exemplary embodiment (Example 2) of a folded camera disclosed herein and numbered 200. FIG. 2A shows embodiment 200 in an isometric view, FIG. 2B shows camera 200 in a side view and FIG. 2C shows camera 200 in a top view. All elements in cameras 100 and 200 are identical except for first lens element $L_1$, which in this embodiment lacks cuts such as 112a and 112b. Therefore, the folded lens in camera 200 is marked 202 and is referred to as a "no cut lens". Detailed optical data for the folded camera 200 and folded lens 202 is given in Tables 1 and 5-7.

Example 2

TABLE 5

| # | | Type | R [mm] | T [mm] | Nd | Vd | A/2 [mm] | W/2 [mm] |
|---|---|---|---|---|---|---|---|---|
| $S_1$ | $L_1S_1$ | Aspheric | 4.712 | 1.300 | 1.48749 | 70.4058 | 2.850 | 2.850 |
| $S_2$ | $L_1S_2$ | Prism Entrance | Infinity | 2.850 | 1.48749 | 70.4058 | 2.850 | 2.850 |
| $S_3$ | | Prism Reflective face | Infinity | −2.850 | 1.48749 | 70.4058 | — | — |
| $S_4$ | * | Prism Exit | Infinity | −0.169 | | | 2.360 | 2.850 |

* the prism exit surface includes a −0.495 mm offset.

TABLE 6

| # | | Type | R [mm] | T [mm] | Nd | Vd | D/2 [mm] |
|---|---|---|---|---|---|---|---|
| $S_5$ | | Standard - Stop | Infinity | −0.206 | | | 1.455 |
| $S_6$ | $L_2S_1$ | Aspheric | 7.821 | −0.296 | 1.6397 | 23.523 | 1.436 |
| $S_7$ | $L_2S_2$ | Aspheric | −5.750 | −0.122 | | | 1.407 |
| $S_8$ | $L_3S_1$ | Aspheric | −4.660 | −1.120 | 1.5348 | 55.664 | 1.425 |

TABLE 6-continued

| # | | Type | R [mm] | T [mm] | Nd | Vd | D/2 [mm] |
|---|---|---|---|---|---|---|---|
| $S_9$ | $L_3S_2$ | Aspheric | 9.045 | −0.154 | | | 1.465 |
| $S_{10}$ | $L_4S_1$ | Aspheric | 12.330 | −1.600 | 1.6397 | 23.523 | 1.412 |
| $S_{11}$ | $L_4S_2$ | Aspheric | 3.090 | −0.155 | | | 1.550 |
| $S_{12}$ | $L_5S_1$ | Aspheric | 2.329 | −0.273 | 1.5348 | 55.664 | 1.484 |
| $S_{13}$ | $L_5S_2$ | Aspheric | −350.821 | −3.905 | | | 1.507 |
| $S_{14}$ | | Standard | Infinity | −0.210 | 1.5168 | 64.2 | 2.930 |
| $S_{15}$ | | Standard | Infinity | −0.400 | | | 2.930 |
| $S_{16}$ | | Standard | Infinity | 0.000 | | | 3.030 |

TABLE 7

| # | k | $\alpha_2$ | $\alpha_3$ |
|---|---|---|---|
| $S_1$ | −0.361 | 9.14E−05 | 3.24E−06 |
| $S_6$ | 18.000 | −1.09E−02 | −1.72E−03 |
| $S_7$ | 2.173 | 1.72E−02 | −7.95E−03 |
| $S_8$ | −4.968 | 2.36E−02 | −6.40E−03 |
| $S_9$ | 22.508 | 4.42E−02 | −4.56E−03 |
| $S_{10}$ | 19.512 | 4.90E−02 | −2.09E−03 |
| $S_{11}$ | −0.257 | 1.90E−02 | −1.20E−03 |
| $S_{12}$ | −0.219 | 4.04E−03 | −2.14E−03 |
| $S_{13}$ | 91.000 | −2.45E−03 | 4.74E−04 |

In folded camera 200, $A_1$ and $W_1$ are 5.70 mm (i.e. in camera 200, $L_1$ is circular). TTL is 14.31 mm and EFL is 15 mm, $TTL_1$ is 11.46 mm, $TTL_2$ is 4.15 mm (i.e., the total TTL=15.61 mm) and OH is 6.05 mm. As in folded camera 100, the prism can have a flat surface parallel to the light entering plane and intersecting the light exiting plane and the light folding plane. In the example shown according to FIG. 2, the apertures of all lens elements are circular.

Given the description and values listed above, it is evident that the optical height (6.05 mm) is smaller than $1.2 \times A_1$ (5.70 mm)=6.84 mm, and smaller even than $1.1 \times A_1$ (=6.27 mm). The ratio TTL/EFL=1.0407, i.e. smaller than 1.2 and even smaller than 1.1. Also, TILL/EFL<1.

Figure 3:
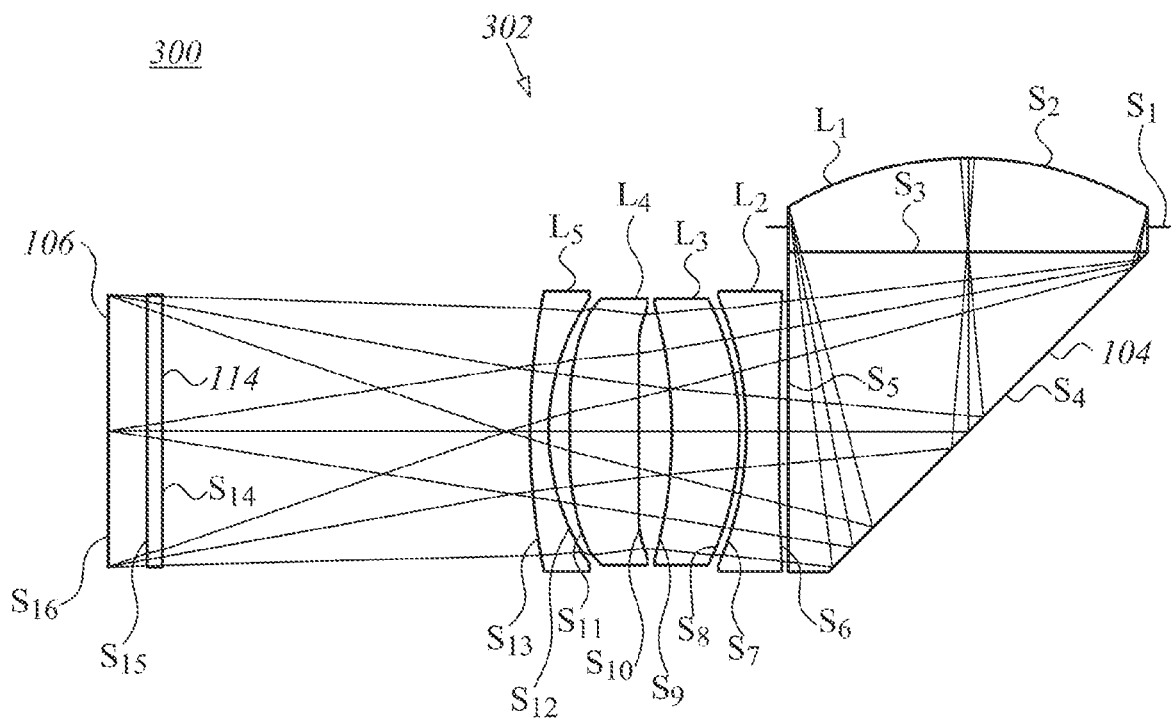
FIG. 3 shows a third exemplary embodiment of a folded camera with light ray tracing from an object to an image sensor.

FIG. 3 shows third exemplary embodiment of folded camera numbered 300 ("Example 3") with lens 302 and light ray tracing from an object to the image sensor. Detailed optical data for the folded camera 300 and folded lens 302 is given in Tables 1 and 8-10. All elements in camera 300 except lens 302 are identical with elements in cameras 100 and 200.

Example 3

TABLE 8

| # | | Type | R [mm] | T [mm] | Nd | Vd | A/2 [mm] | W/2 [mm] |
|---|---|---|---|---|---|---|---|---|
| $S_1$ | | Standard - STOP | Infinity | −0.905 | | | 2.350 | 2.850 |
| $S_2$ | $L_1S_1$ | Aspheric | 4.611 | 1.214 | 1.528 | 76.975 | 2.350 | 2.850 |
| $S_3$ | $L_1S_2$ | Prism Entrance | Infinity | 2.350 | 1.528 | 76.975 | 2.350 | 2.850 |
| $S_4$ | | Prism Reflective face | Infinity | −2.350 | 1.528 | 76.975 | — | — |
| $S_5$ | * | Prism Exit | Infinity | −0.112 | | | 2.100 | 2.850 |

* the prism exit surface includes a −0.265 mm offset.

TABLE 9

| # | | Type | R [mm] | T [mm] | Nd | Vd | D/2 [mm] |
|---|---|---|---|---|---|---|---|
| $S_6$ | $L_2S_1$ | Aspheric | 20.118 | −0.441 | 1.651 | 21.513 | 1.815 |
| $S_7$ | $L_2S_2$ | Aspheric | −4.758 | −0.058 | | | 1.718 |
| $S_8$ | $L_3S_1$ | Aspheric | −3.508 | −0.902 | 1.535 | 56.115 | 1.736 |
| $S_9$ | $L_3S_2$ | Aspheric | −3.904 | −0.421 | | | 1.658 |
| $S_{10}$ | $L_4S_1$ | Aspheric | −8.924 | −0.925 | 1.651 | 21.513 | 1.652 |
| $S_{11}$ | $L_4S_2$ | Aspheric | 10.049 | −0.253 | | | 1.754 |
| $S_{12}$ | $L_5S_1$ | Aspheric | 3.985 | −0.252 | 1.535 | 56.115 | 1.723 |
| $S_{13}$ | $L_5S_2$ | Aspheric | 11.922 | −4.790 | | | 1.815 |
| $S_{14}$ | | Standard | Infinity | −0.210 | 1.516 | 64.167 | 2.889 |
| $S_{15}$ | | Standard | Infinity | −0.500 | | | 2.919 |
| $S_{16}$ | | Standard | Infinity | — | | | 3.030 |

TABLE 10

| # | K | $\alpha_2$ | $\alpha_3$ |
|---|---|---|---|
| $S_2$ | −0.874 | 8.10E−04 | 1.91E−05 |
| $S_6$ | −129.217 | −2.12E−03 | −2.70E−04 |
| $S_7$ | 0.203 | 4.80E−03 | −2.56E−03 |
| $S_8$ | 0.184 | 1.64E−02 | −3.58E−03 |
| $S_9$ | 1.622 | 2.67E−02 | −1.23E−03 |
| $S_{10}$ | −22.269 | 2.61E−02 | 2.30E−03 |
| $S_{11}$ | 12.035 | 2.21E−02 | 9.77E−04 |
| $S_{12}$ | 1.931 | 8.11E−03 | 3.19E−04 |
| $S_{13}$ | 21.054 | 3.37E−04 | 3.10E−04 |

In folded camera 300 (Example 3 and Tables 8-10), $A_1$ and $W_1$ are respectively 4.7 mm and 5.7 mm (i.e. in camera 300. $L_1$ is a cut lens). TLL is 13.56 mm and EFL is 15.00 mm, $TTL_1$ is 3.564 mm, $TTL_2$ is 11.206 mm (i.e., the total TTL=14.77 mm) and OH is 5.37 mm. As in folded camera 100 (surface 104*d*) or 200, the prism can have a flat surface parallel to the light entering plane and intersecting the light exiting plane and the light folding plane that contributes to the reducing of OH. Note that in Examples 3-7 (as well as in Example 1), the apertures of all lens elements except for $L_1$ are circular. Note that in Example 2, all lens elements including L1 have circular apertures.

Given the description and values listed above, it is evident that the optical height (5.37 mm) is smaller than $1.2 \times A_1$ (4.7 mm)=5.64 mm. The ratio TTL/EFL=0.984, i.e. smaller than 1.2 and even smaller than 1.1 and even smaller than 1. Also, TLL/EFL<1.

Figure 4:
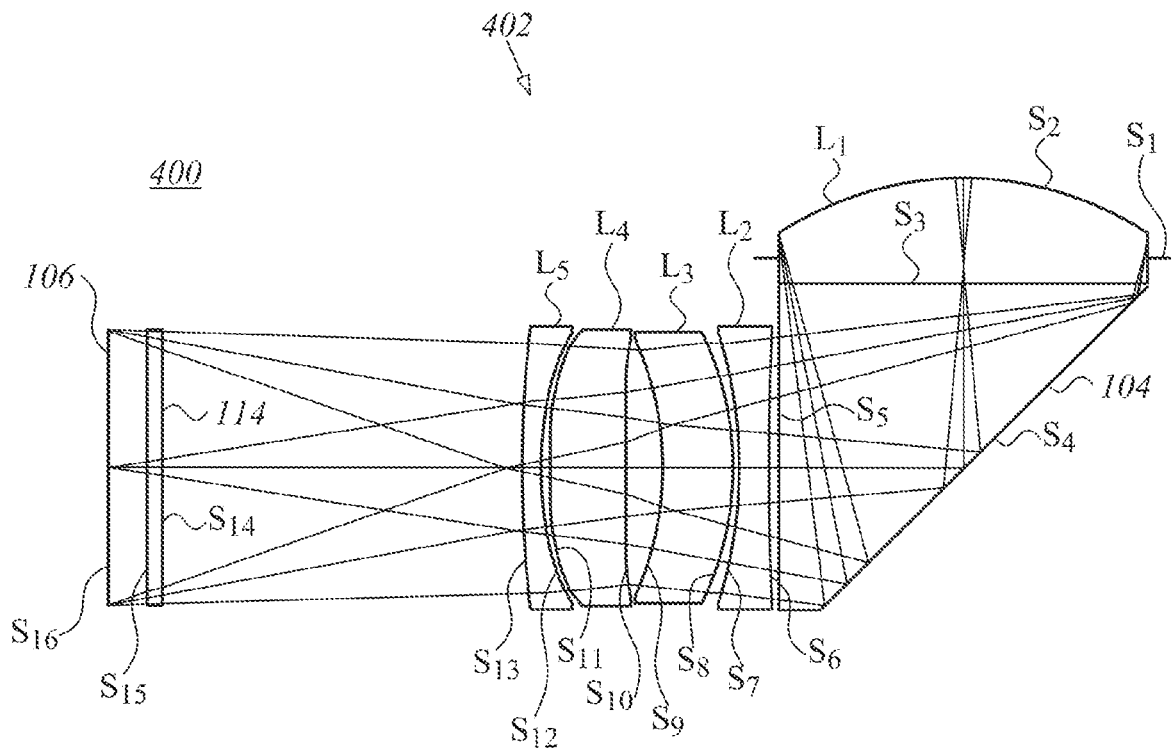
FIG. 4 shows a fourth exemplary embodiment of a folded camera with light ray tracing from an object to an image sensor.

FIG. 4 shows a fourth exemplary embodiment of a folded camera numbered 400 (Example 4) with a lens 402 and light ray tracing from an object to the image sensor. Detailed optical data for the folded camera 400 and folded lens 402 is given in Tables 1 and 11-13. All elements in camera 400 except lens 402 are identical with elements in cameras 100, 200 and 300.

Example 4

TABLE 11

| # | | Type | R [mm] | T [mm] | Nd | Vd | A/2 [mm] | W/2 [mm] |
|---|---|---|---|---|---|---|---|---|
| $S_1$ | | Standard - STOP | Infinity | −1.057 | | | 2.350 | 2.850 |
| $S_2$ | $L_1S_1$ | Aspheric | 4.073 | 1.355 | 1.433 | 95.232 | 2.350 | 2.850 |
| $S_3$ | $L_1S_2$ | Prism Entrance | Infinity | 2.350 | 1.433 | 95.232 | 2.350 | 2.850 |
| $S_4$ | | Prism Reflective face | Infinity | −2.350 | 1.433 | 95.232 | — | — |
| $S_5$ | * | Prism Exit | Infinity | −0.097 | | | 2.080 | 2.850 |

* the prism exit surface includes a −0.270 mm offset.

TABLE 12

| # | | Type | R [mm] | T [mm] | Nd | Vd | D/2 [mm] |
|---|---|---|---|---|---|---|---|
| $S_6$ | $L_2S_1$ | Aspheric | 31.776 | −0.409 | 1.651 | 21.513 | 1.806 |
| $S_7$ | $L_2S_2$ | Aspheric | −7.479 | −0.052 | | | 1.716 |
| $S_8$ | $L_3S_1$ | Aspheric | −3.567 | −0.907 | 1.535 | 56.115 | 1.730 |
| $S_9$ | $L_3S_2$ | Aspheric | −3.247 | −0.498 | | | 1.619 |
| $S_{10}$ | $L_4S_1$ | Aspheric | −14.616 | −0.951 | 1.651 | 21.513 | 1.622 |
| $S_{11}$ | $L_4S_2$ | Aspheric | 9.021 | −0.109 | | | 1.750 |
| $S_{12}$ | $L_5S_1$ | Aspheric | 4.476 | −0.252 | 1.535 | 56.115 | 1.740 |
| $S_{13}$ | $L_5S_2$ | Aspheric | 20.463 | −4.566 | | | 1.806 |
| $S_{14}$ | | Standard | Infinity | −0.210 | 1.516 | 64.167 | 2.876 |
| $S_{15}$ | | Standard | Infinity | −0.500 | | | 2.907 |
| $S_{16}$ | | Standard | Infinity | — | | | 3.030 |

TABLE 13

| # | K | $\alpha_2$ | $\alpha_3$ |
|---|---|---|---|
| $S_2$ | −0.303 | 7.31E−05 | 1.71E−06 |
| $S_6$ | 96.549 | −6.01E−03 | −6.90E−06 |
| $S_7$ | 10.219 | −5.99E−03 | 3.20E−04 |
| $S_8$ | −0.715 | −1.72E−03 | 1.80E−04 |
| $S_9$ | −3.213 | −3.61E−03 | 9.19E−04 |
| $S_{10}$ | −108.408 | 1.13E−02 | 3.97E−03 |
| $S_{11}$ | −0.202 | 6.62E−03 | 3.68E−03 |
| $S_{12}$ | 3.281 | −1.18E−02 | 2.17E−03 |
| $S_{13}$ | 95.038 | −2.74E−03 | 4.32E−04 |

In folded camera 400 (Example 4 and Tables 11-13) $A_1$ and $W_1$ are respectively 4.7 and 5.7 mm. TLL is 13.25 mm and EFL is 14.96 mm, $TTL_1$ is 3.705 mm, $TTL_2$ is 10.895 mm (i.e., the total TTL=14.6 mm) and OH is 5.51 mm. As in folded camera 100 or 200, the prism can have flat surface parallel to the light entering plane and intersecting the light exiting plane and the light folding plane. The apertures of all lens elements are circular.

Given the description and values listed above, it is evident that the optical height (5.51 mm) is smaller than 1.2×$A_1$ (4.7 mm)=5.64 mm. The ratio TTL/EFL=0.975, i.e. smaller than 1.2 and even smaller than 1.1 and even smaller than 1. Also TLL/EFL<1.

Figure 5:
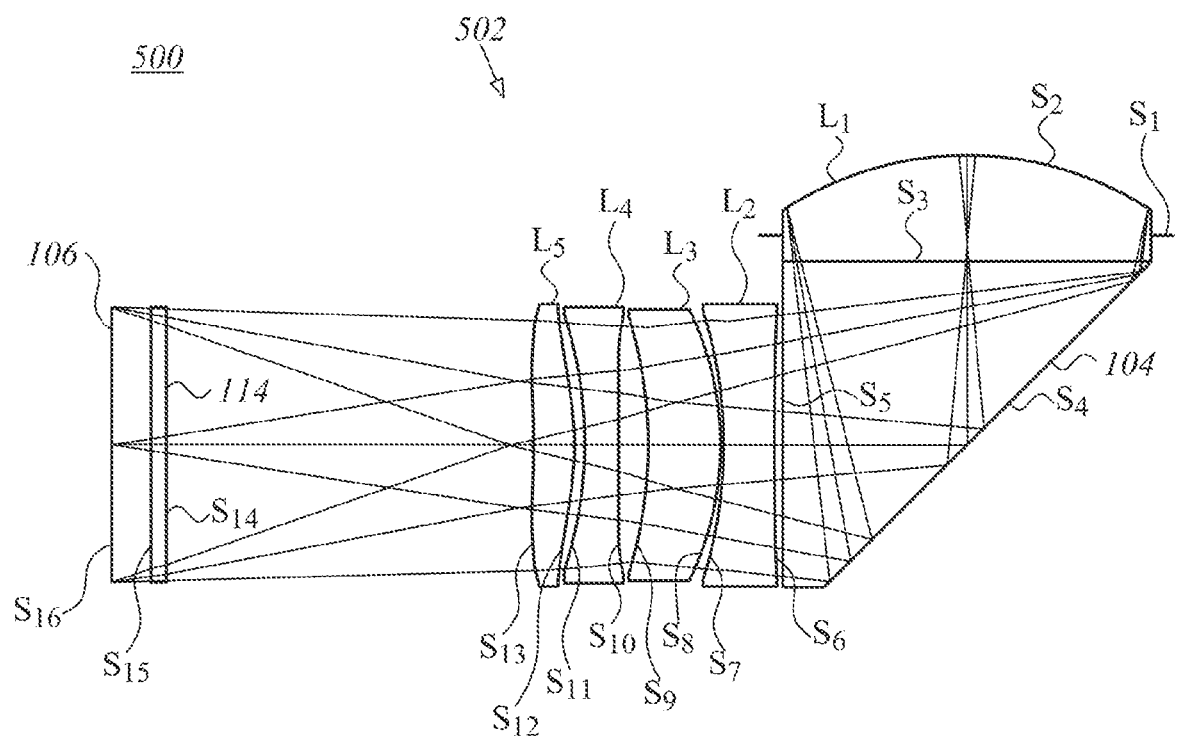
FIG. 5 shows a fifth exemplary embodiment of a folded camera with light ray tracing from an object to an image sensor.

FIG. 5 shows a fifth exemplary embodiment of a folded camera numbered 500 ("Example 5") with a lens 502 and light ray tracing from an object to the image sensor. Detailed optical data for the folded camera 500 and folded lens 502 is given in Tables 1 and 14-16. All elements in camera 500 except lens 502 are identical with elements in cameras 100, 200, 300 and 400.

Example 5

TABLE 14

| # | | Type | R [mm] | T [mm] | Nd | Vd | A/2 [mm] | W/2 [mm] |
|---|---|---|---|---|---|---|---|---|
| $S_1$ | | Standard - STOP | Infinity | −1.065 | | | 2.350 | 2.850 |
| $S_2$ | $L_1S_1$ | Aspheric | 4.062 | 1.359 | 1.433 | 95.232 | 2.350 | 2.850 |
| $S_3$ | $L_1S_2$ | Prism Entrance | Infinity | 2.350 | 1.433 | 95.232 | 2.350 | 2.850 |
| $S_4$ | | Prism Reflective face | Infinity | −2.350 | 1.433 | 95.232 | — | — |
| $S_5$ | * | Prism Exit | Infinity | −0.098 | | | 2.080 | 2.850 |

* the prism exit surface includes a −0.27 mm offset.

TABLE 15

| # | | Type | R [mm] | T [mm] | Nd | Vd | D/2 [mm] |
|---|---|---|---|---|---|---|---|
| $S_6$ | $L_2S_1$ | Aspheric | 52.828 | −0.649 | 1.651 | 21.513 | 1.800 |
| $S_7$ | $L_2S_2$ | Aspheric | −6.365 | −0.052 | | | 1.709 |
| $S_8$ | $L_3S_1$ | Aspheric | −3.970 | −0.906 | 1.535 | 56.115 | 1.720 |
| $S_9$ | $L_3S_2$ | Aspheric | −3.651 | −0.380 | | | 1.636 |
| $S_{10}$ | $L_4S_1$ | Aspheric | −7.218 | −0.446 | 1.535 | 56.115 | 1.637 |
| $S_{11}$ | $L_4S_2$ | Aspheric | −3.214 | −0.131 | | | 1.749 |
| $S_{12}$ | $L_5S_1$ | Aspheric | −4.056 | −0.531 | 1.651 | 21.513 | 1.765 |
| $S_{13}$ | $L_5S_2$ | Aspheric | −16.194 | −4.665 | | | 1.807 |
| $S_{14}$ | | Standard | Infinity | −0.210 | 1.516 | 64.167 | 2.883 |
| $S_{15}$ | | Standard | Infinity | −0.500 | | | 2.914 |
| $S_{16}$ | | Standard | Infinity | — | | | 3.030 |

TABLE 16

| # | k | $\alpha_2$ | $\alpha_3$ |
|---|---|---|---|
| $S_2$ | −0.225 | −3.72E−05 | −3.37E−06 |
| $S_6$ | 2.287 | −1.24E−03 | 1.30E−04 |
| $S_7$ | 3.112 | −5.95E−03 | 1.01E−03 |
| $S_8$ | −0.731 | −1.11E−03 | 3.02E−04 |
| $S_9$ | 0.084 | 2.12E−02 | −1.55E−03 |
| $S_{10}$ | −24.608 | 2.74E−02 | 7.22E−04 |
| $S_{11}$ | −10.147 | 8.67E−04 | 1.15E−03 |
| $S_{12}$ | −13.144 | 3.59E−03 | 1.08E−03 |
| $S_{13}$ | −14.426 | 1.64E−02 | −1.25E−04 |

In folded camera 500 (Example 5 and Tables 14-16), $A_1$ and $W_1$ are respectively 4.7 and 5.7 mm. TLL is 13.26 mm and EFL is 14.958 mm, $TTL_1$ is 3.709 mm, $TTL_2$ is 10.911 mm (i.e., the total TTL=14.62 mm) and OH is 5.51 mm. As in folded camera 100 or 200, the prism can have a flat surface parallel to the light entering plane and intersecting the light exiting plane and the light folding plane. The apertures of all lens elements are circular.

Given the description and values listed above, it is evident that the optical height (5.51 mm) is smaller than 1.2×$A_1$ (4.7 mm)=5.64 mm. The ratio TTL/EFL=0.977, i.e. smaller than 1.2 and even smaller than 1.1 and even smaller than 1. Also, TLL/EFL<1.

Figure 6:
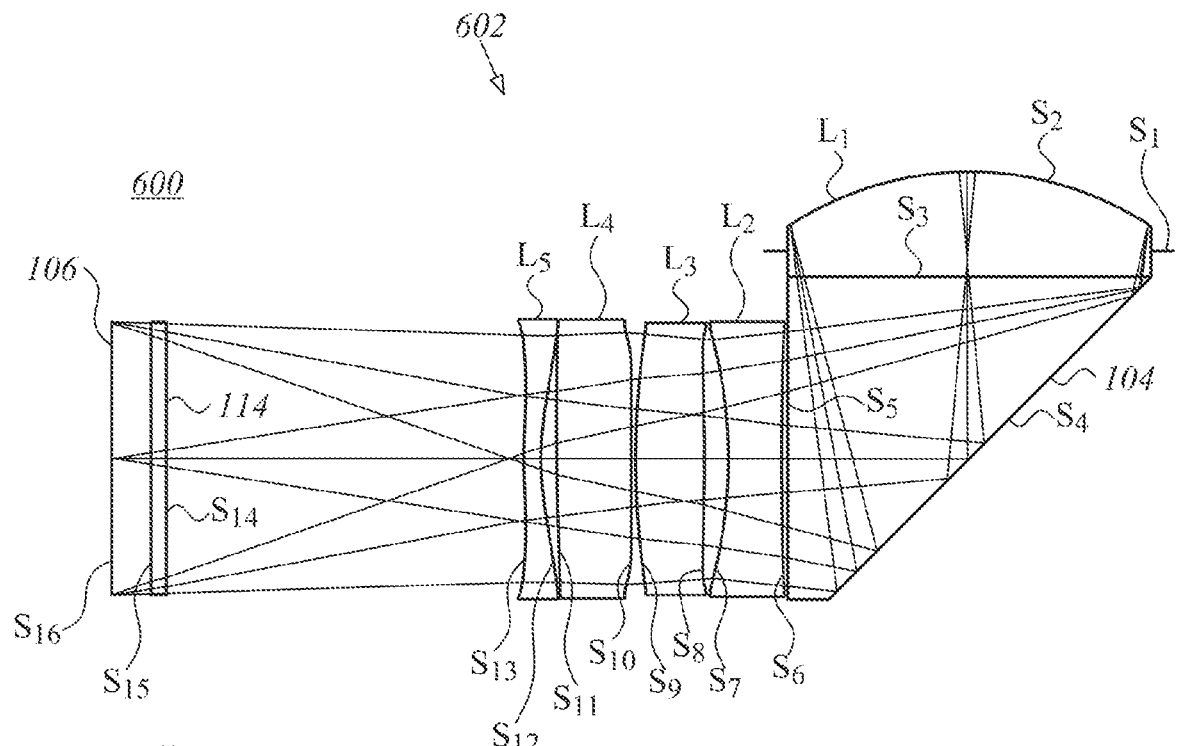
FIG. 6 shows a sixth exemplary embodiment of a folded camera with light ray tracing from an object to an image sensor.

FIG. 6 shows a sixth exemplary embodiment of a folded camera numbered 600 (Example 6) with a lens 602 and light ray tracing from an object to the image sensor. Detailed optical data for the folded camera 600 and folded lens 602 is given in Tables 1 and 17-19. All elements in camera 600 except lens 602 are identical with elements in cameras 100, 200, 300, 400 and 500.

Example 6

TABLE 17

| # | | Type | R [mm] | T [mm] | Nd | Vd | A/2 [mm] | W/2 [mm] |
|---|---|---|---|---|---|---|---|---|
| $S_1$ | | Standard - STOP | Infinity | −1.060 | | | 2.350 | 2.850 |
| $S_2$ | $L_1S_1$ | Aspheric | 4.078 | 1.355 | 1.456 | 90.900 | 2.350 | 2.850 |
| $S_3$ | $L_1S_2$ | Prism Entrance | Infinity | 2.350 | 1.456 | 90.900 | 2.350 | 2.850 |
| $S_4$ | | Prism Reflective face | Infinity | −2.350 | 1.456 | 90.900 | — | — |
| $S_5$ | | Prism Exit | Infinity | −0.107 | | | 2.080 | 2.850 |

*the prism exit surface includes a −0.27 mm offset.

TABLE 18

| # | | Type | R [mm] | T [mm] | Nd | Vd | D/2 [mm] |
|---|---|---|---|---|---|---|---|
| $S_6$ | $L_2S_1$ | Aspheric | 15.780 | −0.670 | 1.651 | 21.513 | 1.767 |
| $S_7$ | $L_2S_2$ | Aspheric | −5.439 | −0.295 | | | 1.653 |
| $S_8$ | $L_3S_1$ | Aspheric | −8.111 | −0.907 | 1.651 | 21.513 | 1.653 |
| $S_9$ | $L_3S_2$ | Aspheric | 5.073 | −0.051 | | | 1.760 |
| $S_{10}$ | $L_4S_1$ | Aspheric | 7.664 | −0.953 | 1.651 | 21.513 | 1.789 |
| $S_{11}$ | $L_4S_2$ | Aspheric | 37.777 | −0.207 | | | 1.809 |
| $S_{12}$ | $L_5S_1$ | Aspheric | 5.035 | −0.250 | 1.535 | 56.115 | 1.809 |
| $S_{13}$ | $L_5S_2$ | Aspheric | 22.129 | −4.588 | | | 1.811 |
| $S_{14}$ | | Standard | Infinity | −0.210 | 1.516 | 64.167 | 2.864 |
| $S_{15}$ | | Standard | Infinity | −0.500 | | | 2.896 |
| $S_{16}$ | | Standard | Infinity | — | | | 3.030 |

TABLE 19

| # | K | $\alpha_2$ | $\alpha_3$ |
|---|---|---|---|
| $S_2$ | −0.283 | 7.76E−05 | 3.45E−06 |
| $S_6$ | 22.671 | −1.94E−04 | −1.43E−03 |
| $S_7$ | 6.703 | 1.44E−02 | 8.50E−05 |
| $S_8$ | −31.425 | 9.90E−03 | 4.27E−03 |
| $S_9$ | −35.446 | −2.24E−02 | 5.67E−03 |
| $S_{10}$ | −112.063 | −3.55E−02 | 5.52E−03 |
| $S_{11}$ | 63.734 | −1.41E−03 | 2.85E−04 |
| $S_{12}$ | 2.909 | −9.30E−03 | −2.48E−03 |
| $S_{13}$ | 113.315 | −6.41E−03 | −1.64E−03 |

In folded camera 600 (Example 6 and Tables 17-19), $A_1$ and $W_1$ are respectively 4.7 and 5.7 mm. TLL is 13.43 mm and EFL is 14.961 mm, TTL is 3.705 mm. $TTL_2$ is 11.085 mm (i.e., the total TTL=14.79 mm) and OH is 5.51 mm. As in folded camera 100 or 200, the prism can have a flat surface parallel to the light entering plane and intersecting the light exiting plane and the light folding plane. The apertures of all lens elements are circular.

Given the description and values listed above, it is evident that the optical height (5.51 mm) is smaller than $1.2 \times A_1$ (4.7 mm)=5.64 mm. The ratio TTL/EFL=0.988, i.e. smaller than 1.2 and even smaller than 1.1 and even smaller than 1. Also, TLL/EFL<1.

Figure 7:
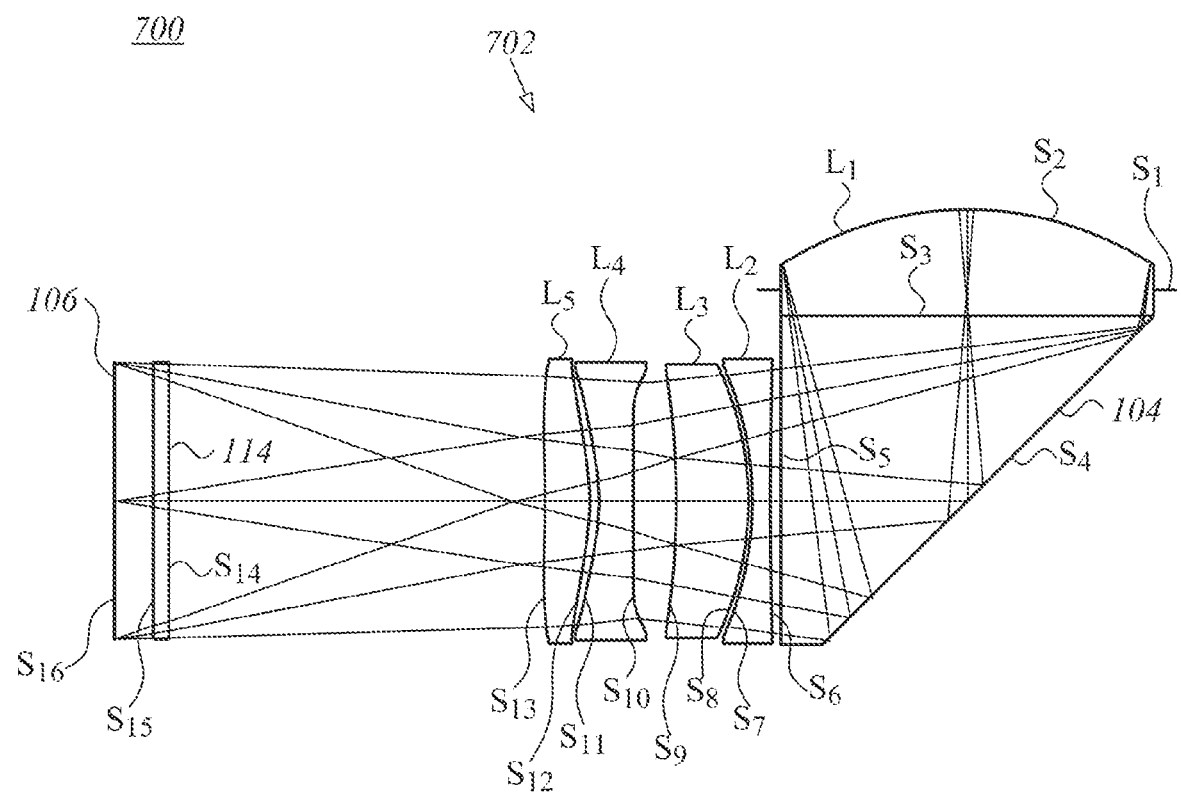
FIG. 7 shows a seventh exemplar embodiment of a folded camera with light ray tracing from an object to an image sensor.

FIG. 7 shows a seventh exemplary embodiment of a folded camera numbered 700 (Example 7) with a lens 702 and light ray tracing from an object to the image sensor. Detailed optical data for the folded camera 700 and folded lens 702 is given in Tables 1 and 20-22. All elements in camera 700 except lens 702 are identical with elements in cameras 100, 200, 300, 400, 500 and 600.

TABLE 20

| # | | Type | R [mm] | T [mm] | Nd | Vd | A/2 [mm] | W/2 [mm] |
|---|---|---|---|---|---|---|---|---|
| $S_1$ | | Standard - STOP | Infinity | −1.024 | | | 2.350 | 2.850 |
| $S_2$ | $L_1S_1$ | Aspheric | 4.166 | 1.328 | 1.433 | 95.232 | 2.350 | 2.850 |
| $S_3$ | $L_1S_2$ | Prism Entrance | Infinity | 2.350 | 1.433 | 95.232 | 2.350 | 2.850 |
| $S_4$ | | Prism Reflective face | Infinity | −2.350 | 1.433 | 95.232 | — | — |
| $S_5$ | | Prism Exit | Infinity | −0.098 | | | 2.080 | 2.850 |

*the prism exit surface includes a −0.27 mm offset.

TABLE 21

| # | | Type | R [mm] | T [mm] | Nd | Vd | D/2 [mm] |
|---|---|---|---|---|---|---|---|
| $S_6$ | $L_2S_1$ | Aspheric | −25.077 | −0.253 | 1.651 | 21.513 | 1.791 |
| $S_7$ | $L_2S_2$ | Aspheric | −3.922 | −0.056 | | | 1.715 |
| $S_8$ | $L_3S_1$ | Aspheric | −4.023 | −0.906 | 1.535 | 56.115 | 1.721 |
| $S_9$ | $L_3S_2$ | Aspheric | −6.284 | −0.549 | | | 1.646 |
| $S_{10}$ | $L_4S_1$ | Aspheric | −7.945 | −0.431 | 1.535 | 56.115 | 1.615 |
| $S_{11}$ | $L_4S_2$ | Aspheric | −2.399 | −0.115 | | | 1.754 |
| $S_{12}$ | $L_5S_1$ | Aspheric | −3.472 | −0.563 | 1.651 | 21.513 | 1.773 |
| $S_{13}$ | $L_5S_2$ | Aspheric | −15.725 | −4.747 | | | 1.803 |
| $S_{14}$ | | Standard | Infinity | −0.210 | 1.516 | 4.167 | 2.877 |
| $S_{15}$ | | Standard | Infinity | −0.500 | | | 2.908 |
| $S_{16}$ | | Standard | Infinity | — | | | 3.030 |

TABLE 22

| # | K | $\alpha_2$ | $\alpha_3$ |
|---|---|---|---|
| $S_2$ | −0.373 | 1.69E−04 | 7.56E−06 |
| $S_6$ | −30.531 | 5.01E−03 | −1.01E−03 |
| $S_7$ | −0.953 | 4.25E−03 | −1.57E−03 |
| $S_8$ | −5.260 | −3.33E−03 | −1.47E−03 |
| $S_9$ | −22.816 | 1.13E−02 | −1.86E−03 |
| $S_{10}$ | −91.835 | 4.26E−02 | −8.24E−04 |
| $S_{11}$ | −8.964 | 7.03E−03 | 2.50E−04 |
| $S_{12}$ | −13.635 | 4.43E−03 | −2.45E−04 |
| $S_{13}$ | −36.786 | 2.05E−02 | −2.06E−03 |

In folded camera 700 (Example 7 and Tables 20-22), $A_1$ and $W_1$ are respectively 4.7 and 5.7 mm. TLL is 13.13 mm and EFL is 14.967 mm. $TTL_1$ is 3.678 mm. $TTL_2$ is 10.772 mm (i.e., the total TTL=14.45 mm) and OH is 5.48 mm. As in other folded cameras, the prism can have a flat surface parallel to the light entering plane and intersecting the light exiting plane and the light folding plane. The apertures of all lens elements are circular.

Given the description and values listed above, it is evident that the optical height (5.48 mm) is smaller than $1.2 \times A_1$ (4.7 mm)=5.64 mm. The ratio TTL/EFL=0.965, i.e. smaller than 1.2 and even smaller than 1.1 and even smaller than 1. Also, TLL/EFL<1.

Table 23 summarizes the design characteristics and parameters as they appear in the examples listed above. These characteristics helps to achieve the goal of a compact folded lens with large lens assembly aperture:

"AA": $AA_1 \equiv BFL/TTL > 0.2$, $AA_2 \equiv BFL/TTL > 0.28$, $AA_3 \equiv BFL/TTL > 0.35$;

"BB": $BB_1 \equiv OH/A_1 < 1.4$, $BB_2 \equiv OH/A_1 < 1.2$, $BB_3 \equiv OH/A_1 < 1.1$;

"CC": $CC_1 \equiv OH/W_1 < 1.1$, $CC_2 \equiv OH/W_1 < 1.00$, $CC_3 \equiv OH/W_1 < 0.95$;

"DD": At least two gaps that comply with $DD_1 \equiv STD < 0.020$, $DD_2 \equiv STD < 0.015$, $DD_3 \equiv STD < 0.010$;

"EE": At least 3 gaps that comply with $EE_1 \equiv STD < 0.035$, $EE_2 \equiv STD < 0.025$, $EE_3 \equiv STD < 0.015$;

"FF": At least 4 gaps that comply with $FF_1 \equiv STD < 0.050$, $FF_2 \equiv STD < 0.035$, $FF_3 \equiv STD < 0.025$:

"GG": $GG_1 \equiv SDL/OH > 0.7$, $GG_2 \equiv SDL/OH > 0.85$, $GG_3 \equiv SDL/OH > 1$;

"HH": a power sign sequence;

"II": At least 1 gap that complies with $II_1 \equiv STD < 0.01$ and $OA\_Gap/TTL < 1/80$, $II_2 \equiv STD < 0.015$ and $OA\_Gap/TTL < 1/65$;

"JJ": Abbe number sequence of lens element 1, 2 and 3 can be respectively larger than 50, smaller than 30 and larger than 50;

"KK": Effective focal length of combined lens elements 2 and 3 is negative:

"LL": $LL_1 \equiv f1/EFL < 0.7$, $LL_2 \equiv f1/EFL < 0.6$;

"MM": $MM_1 \equiv |f_2/f_1| < 1$, $MM_2 \equiv |f_2/f_1| < 0.7$; and

"NN": $L_2$ to $L_N$ have circular apertures.

Table 23 indicates whether a parameter or a condition is fulfilled (symbol "✓") or not fulfilled (symbol "x") in each Example. The cited examples are brought in order to illustrate the principles of the disclosed subject matter and should not be construed as limiting. Other examples are also contemplated within the scope of the presently disclosed subject matter.

TABLE 23

|  | Example | | | | | | |
|---|---|---|---|---|---|---|---|
|  | EX1 | EX2 | EX3 | EX4 | EX5 | EX6 | EX7 |
| $AA_1$ | ✓ | ✓ | ✓ | ✓ | ✓ | ✓ | ✓ |
| $AA_2$ | ✓ | ✓ | ✓ | ✓ | ✓ | ✓ | ✓ |
| $AA_3$ | x | x | ✓ | ✓ | ✓ | ✓ | ✓ |
| $BB_1$ | ✓ | ✓ | ✓ | ✓ | ✓ | ✓ | ✓ |
| $BB_2$ | ✓ | ✓ | ✓ | ✓ | ✓ | ✓ | ✓ |
| $BB_3$ | x | ✓ | x | x | x | x | x |
| $CC_1$ | ✓ | ✓ | ✓ | ✓ | ✓ | ✓ | ✓ |
| $CC_2$ | ✓ | ✓ | ✓ | ✓ | ✓ | ✓ | ✓ |
| $CC_3$ | ✓ | x | ✓ | x | x | x | x |
| $DD_1$ | ✓ | ✓ | ✓ | ✓ | ✓ | ✓ | ✓ |
| $DD_2$ | ✓ | ✓ | ✓ | ✓ | ✓ | x | ✓ |
| $DD_3$ | x | ✓ | x | x | x | x | ✓ |
| $EE_1$ | ✓ | ✓ | ✓ | ✓ | ✓ | ✓ | ✓ |
| $EE_2$ | ✓ | ✓ | ✓ | x | ✓ | x | ✓ |
| $EE_3$ | ✓ | ✓ | x | x | x | x | ✓ |
| $FF_1$ | ✓ | ✓ | ✓ | x | x | ✓ | ✓ |
| $FF_2$ | ✓ | ✓ | x | x | x | x | x |
| $FF_3$ | ✓ | ✓ | x | x | x | x | x |
| $GG_1$ | ✓ | ✓ | ✓ | ✓ | ✓ | ✓ | ✓ |
| $GG_2$ | ✓ | ✓ | ✓ | ✓ | ✓ | ✓ | ✓ |
| $GG_3$ | ✓ | x | ✓ | ✓ | ✓ | ✓ | ✓ |
| HH | PNPPN | PNPPN | PNPPN | PNNPN | PNNNP | PNPNN | PNPNP |
| $II_1$ | ✓ | ✓ | ✓ | ✓ | ✓ | x | ✓ |
| $II_2$ | ✓ | ✓ | ✓ | ✓ | ✓ | ✓ | ✓ |
| JJ | ✓ | ✓ | ✓ | ✓ | ✓ | ✓ | ✓ |
| KK | ✓ | ✓ | ✓ | ✓ | ✓ | x | ✓ |
| $LL_1$ | ✓ | ✓ | ✓ | ✓ | ✓ | ✓ | ✓ |
| $LL_2$ | ✓ | x | ✓ | x | x | ✓ | ✓ |
| $MM_1$ | ✓ | ✓ | ✓ | ✓ | ✓ | ✓ | ✓ |
| $MM_2$ | ✓ | ✓ | ✓ | x | x | ✓ | x |
| NN | ✓ | ✓ | ✓ | ✓ | ✓ | ✓ | ✓ |

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A folded lens assembly comprising: from an object side to an image side, a) a positive first lens element $L_1$ with a first optical axis and a first lens width $W_1$;

b) a light folding element;

c) a plurality of additional lens elements $L_2$-$L_N$ with a common second optical axis; and d) an image sensor having a sensor diagonal length SDL, wherein the light folding element is configured to fold light from the first optical axis to the second optical axis, wherein the folded lens has an optical height OH, wherein SDL/OH>0.7 and wherein OH/$W_1$<1.1.

2. The folded lens assembly of claim 1, wherein SDL/OH>1.

3. The folded lens assembly of claim 1, wherein OH/$W_1$<0.95.

4. The folded lens assembly of claim 1, wherein the lens assembly has a back focal length BFL and a total track length TTL and wherein BFL/TTL>0.2.

5. The folded lens assembly of claim 1, wherein the lens assembly has a back focal length BFL and a total track length TTL and wherein BFL/TTL>0.35.

6. The folded lens assembly of claim 1, wherein the first lens element has a length $A_1$ and wherein OH/$A_1$<1.4.

7. The folded lens assembly of claim 1, wherein the first lens element has a length $A_1$ and wherein OH/$A_1$<1.1.

8. The folded lens assembly of claim 1, wherein the lens assembly includes at least two air gaps between lens elements that comply with the condition STD<0.020, where STD is a normalized gap standard deviation and $r_{norm}$ is a minimum value of half a gap between adjacent surfaces $L_iS_2$ and $L_{i+1}S_1$.

9. The folded lens assembly of claim 1, wherein the lens assembly includes at least two air gaps between lens elements that comply with the condition STD<0.010, where STD is a normalized gap standard deviation and $r_{norm}$ is a minimum value of half a gap between adjacent surfaces $L_iS_2$ and $L_{i+1}S_1$.

10. The folded lens assembly of claim 1, wherein the lens assembly includes at least three air gaps between lens elements that comply with the condition STD<0.035, where STD is a normalized gap standard deviation and $r_{norm}$ is a minimum value of half a gap between adjacent surfaces $L_iS_2$ and $L_{i+1}S_1$.

11. The folded lens assembly of claim 1, wherein the lens assembly includes at least three air gaps between lens elements that comply with the condition STD<0.015, where STD is a normalized gap standard deviation and $r_{norm}$ is a minimum value of half a gap between adjacent surfaces $L_iS_2$ and $L_{i+1}S_1$.

12. The folded lens assembly of claim 1, wherein the lens assembly includes at least four air gaps between lens elements that comply with the condition STD<0.050, where STD is a normalized gap standard deviation and $r_{norm}$ is a minimum value of half a gap between adjacent surfaces $L_iS_2$ and $L_{i+1}S_1$.

13. The folded lens assembly of claim 1, wherein the lens assembly includes at least four air gaps between lens elements that comply with the condition STD<0.025, where STD is a normalized gap standard deviation and $r_{norm}$ is a minimum value of half a gap between adjacent surfaces $L_iS_2$ and $L_{i+1}S_1$.

14. The folded lens assembly of claim 1, wherein the lens assembly includes, from the object side to the image side five lens elements with any one of the following power sign sequence: PNPPN, PNNPN, PNNNP, PNPNN, and PNPNP.

15. The folded lens assembly of claim 1, wherein the lens assembly includes at least one air gap between lens elements that complies with the conditions STD<0.01 and OA_Gap/TTL<1/80, where STD is a normalized gap standard deviation and OA_Gap is an on-axis gap.

16. The folded lens assembly of claim 1, wherein the lens assembly includes at least one air gap between lens elements that complies with the conditions STD<0.01 and OA_Gap/

TTL<1/65, where STD is a normalized gap standard deviation and OA_Gap is an on-axis gap.

17. The folded lens assembly of claim 1, wherein the first lens element, a second lens element and a third lens element have respective Abbe numbers larger than 50, smaller than 30 and larger than 50.

18. The folded lens assembly of claim 12, wherein the second lens element and a third lens element have together a negative effective focal length.

19. The folded lens assembly of claim 1, wherein the lens assembly has an effective focal length EFL, wherein the first lens element has a focal length $f_1$ and wherein $f_1/EFL<0.7$.

20. The folded lens assembly of claim 1, wherein the lens assembly has an effective focal length EFL, wherein the first lens element has a focal length $f_1$ and wherein $f_1/EFL<0.6$.

21. The folded lens assembly of claim 17, wherein the first lens element has a focal length $f_1$, wherein the second lens element has a focal length $f_2$ and wherein $|f_2/f_1|<1$.

22. The folded lens assembly of claim 17, wherein the first lens element has a focal length $f_1$, wherein the second lens element has a focal length $f_2$ and wherein $|f_2/f_1|<0.7$.

23. The folded lens assembly of claim 1, wherein $L_2$ to $L_N$ have circular apertures.

24. The folded lens assembly of claim 1, wherein the lens assembly has an effective focal length EFL and a total track length TTL and wherein TTL/EFL<1.1.

25. The folded lens assembly of claim 1, wherein the apertures of the first lens element is cut along the second optical axis.

26. The folded lens assembly of claim 1, wherein the lens assembly has an effective focal length EFL and a total lens element length TLL, wherein the TLL/EFL<1.

27. The folded lens assembly of claim 1, wherein the first lens element is made of glass and wherein the second lens element and the plurality of lens elements are made of plastic.

28. The folded lens assembly of claim 1, wherein the all the lens elements are made of plastic.

* * * * *